US011106838B2

(12) United States Patent
Jackson et al.

(10) Patent No.: US 11,106,838 B2
(45) Date of Patent: Aug. 31, 2021

(54) SYSTEMS, METHODS, AND APPARATUS TO GENERATE AN INTEGRATED MODULAR ARCHITECTURE MODEL

(71) Applicant: The Boeing Company, Chicago, IL (US)

(72) Inventors: Timothy E. Jackson, Mukilteo, WA (US); Steven M. Walstrom, Lynnwood, WA (US); Christopher M. Uyeda, Seattle, WA (US)

(73) Assignee: The Boeing Company, Chicago, IL (US)

( * ) Notice: Subject to any disclaimer, the term of this patent is extended or adjusted under 35 U.S.C. 154(b) by 562 days.

(21) Appl. No.: 15/948,180

(22) Filed: Apr. 9, 2018

(65) Prior Publication Data

US 2019/0311087 A1 Oct. 10, 2019

(51) Int. Cl.
*G06F 30/15* (2020.01)
*G06F 111/20* (2020.01)
*G06F 119/18* (2020.01)

(52) U.S. Cl.
CPC .......... *G06F 30/15* (2020.01); *G06F 2111/20* (2020.01); *G06F 2119/18* (2020.01)

(58) Field of Classification Search
CPC .............................. G06F 2111/20; G06F 30/15
See application file for complete search history.

(56) References Cited

U.S. PATENT DOCUMENTS

| 8,332,504 B2* | 12/2012 | Ling | G06F 11/3696 709/224 |
| 8,812,284 B2 | 8/2014 | Damiani et al. | |
| 8,826,302 B2* | 9/2014 | Casteres | G09B 9/08 719/313 |

(Continued)

OTHER PUBLICATIONS

Horváth, Ákos, et al. "Hardware-software allocation specification of ima systems for early simulation." 2014 IEEE/AIAA 33rd Digital Avionics Systems Conference (DASC). IEEE, 2014. (Year: 2014).*

(Continued)

*Primary Examiner* — Omar F Fernandez Rivas
*Assistant Examiner* — David A Hopkins
(74) *Attorney, Agent, or Firm* — Hanley, Flight & Zimmerman, LLC

(57) ABSTRACT

Systems, methods, apparatus, and articles of manufacture are disclosed to generate an integrated modular architecture (IMA) model. An example apparatus includes an interface importer to import first IMA protocol definitions into a computer modeling environment to generate libraries and generate IMA model objects, a model object handler to import ones of IMA model objects into the computer modeling environment to generate a first IMA model corresponding to an aircraft system of an aircraft and generate an IMA system model corresponding to the aircraft by generating IMA models including the first IMA model. The example apparatus further includes an interface validator to validate the IMA system model by comparing an output of the IMA system model to a validation output, an interface exporter to (Continued)

generate manufacturing build instructions of the aircraft system when the IMA system model is validated, and a report generator to initiate production of the aircraft system.

20 Claims, 14 Drawing Sheets

(56) References Cited

U.S. PATENT DOCUMENTS

| | | | | |
|---|---|---|---|---|
| 10,511,515 | B1* | 12/2019 | Ehlinger | H04L 43/14 |
| 2018/0039725 | A1* | 2/2018 | Gonnsen | G06Q 10/06 |

OTHER PUBLICATIONS

Ferreira, Ronaldo Rodrigues. "Integrated model-based design and simulation of critical embedded systems." (2009). (Year: 2009).*
Shames, Peter M., Marc A. Sarrel, and Sanford Friedenthal. "A representative application of a layered interface modeling pattern." INCOSE International Symposium. vol. 26. No. 1. 2016. (Year: 2016).*
Annighöfer, Björn, Ernst Kleemann, and Frank Thielecke. "Model-based development of integrated modular avionics architectures on aircraft-level." Deutscher Luft-und Raumfahrtkongress. vol. 9. 2011. (Year: 2011).*
Bhatt, Devesh, et al. "Towards scalable verification of commercial avionics software." AIAA Infotech@ Aerospace 2010. 2010. 3452. (Year: 2010).*
Erdinç, Emre. Soft afdx (avionics full duplex switched ethernet) end system implementation with standard pc and ethernetcard. Diss. Middle East Technical University, 2010. (Year: 2010).*
Krodel, Jim, and George Romanski. Handbook for Real Time Operation Systems Integration and Component Integration Considerations in Integrated Modular Avionics Systems. Office of Aviation Research and Development, Federal Aviation Administration, 2008. (Year: 2008).*
Halle, Martin, and Frank Thielecke. "Model-based transition of IMA architecture into configuration data." 2016 IEEE/AIAA 35th Digital Avionics Systems Conference (DASC). IEEE, 2016. (Year: 2016).*
Hugues, Jerome, and Julien Delange. "Model-based design and automated validation of ARINC653 architectures." 2015 International Symposium on Rapid System Prototyping (RSP). IEEE, 2015. (Year: 2015).*
Lafaye, Michaël, et al. "Model driven early exploration of IMA execution platform." 2011 IEEE/AIAA 30th Digital Avionics Systems Conference. IEEE, 2011. (Year: 2011).*
Louadah, Hassna, et al. "A data extraction process for avionics systems' interface specifications." 2016 4th International Conference on Model-Driven Engineering and Software Development (MODELSWARD). IEEE, 2016. (Year: 2016).*
Lalli, Vincent R., Robert E. Kastner, and Henry N. Hartt. "Training Manual for Elements of Interface Definition and Control." (1997). (Year: 1999).*
Pasareanu, Corina S., et al. "Model based analysis and test generation for flight software." 2009 Third IEEE International Conference on Space Mission Challenges for Information Technology. IEEE, 2009. (Year: 2009).*
Russel, M. S., Sangal, N., Waldman, F., Lipkin, I., Huber, A. K., Hoffmann, H. P., . . . & Voas, J. (2005). CrossTalk: The Journal of Defense Software Engineering. vol. 18, No. 11. Software Technology Support Center Hill AFB UT. (Year: 2005).*
Wetzel Technology, "ARINC825 General Standardization of CAN (Controller Area Network) Bus Protocol for Airborne Use", 2010, accessed electronically via PDF4PRO (Year: 2010).*
Sennes, Ulrich, and Roland Schabenberger. "Model Integration with the Common Simulation Framework SIRIUS." AIAA Modeling and Simulation Technologies Conference. 2011. (Year: 2011).*
Horváth, Ákos, and Dániel Varró. "Model-driven development of ARINC 653 configuration tables." 29th Digital Avionics Systems Conference. IEEE, 2010. (Year: 2010).*
Darwesh, Darbaz & Annighöfer, Björn. (2018). A demonstrator for the verification of the selective integration of the Flexible Platform approach into Integrated Modular Avionics. Accessed via Research Gate. Conference Paper from the Digital Avionics Systems Conference Sep. 2018 (Year: 2018).*
Guduvan, A. "A model-driven development of tests for avionic embedded systems." ISAE. Toulouse, France (2013): 27. (Year: 2013).*
Liu, Chang, Jun Zheng, and Zhanyong Ren. "Software architecture of Integrated Modular Avionics software testing environment." IEEE Conference Anthology. IEEE, 2013. (Year: 2013).*
European Patent Office, "Extended European Search Report," dated Sep. 3, 2019 in connection with European Patent Application No. 19160626.8, 7 pages.

* cited by examiner

SYSTEMS, METHODS, AND APPARATUS TO GENERATE AN INTEGRATED MODULAR ARCHITECTURE MODEL

FIELD OF THE DISCLOSURE

This disclosure relates generally to aircraft and, more particularly, to systems, methods, and apparatus to generate an integrated modular architecture model.

BACKGROUND

In recent years, typical aircraft systems have become increasingly integrated to improve monitoring and operation of the aircraft systems. Managing interfaces between the aircraft systems has become progressively complex. Increased cost can occur due to re-design of the aircraft systems to improve integration inefficiencies discovered during manufacturing and assembly of the aircraft systems. Computer-generated models can be used to evaluate an efficacy of aircraft system designs prior to being released for use in manufacturing.

SUMMARY

Systems, methods, apparatus, and articles of manufacture to generate an integrated modular architecture model are disclosed. An example apparatus includes an interface importer to import first IMA protocol definitions into a first computer modeling environment to generate a plurality of libraries based on the first IMA protocol definitions and generate a plurality of IMA model objects based on the plurality of libraries, a model object handler to import ones of the plurality of IMA model objects into the first computer modeling environment to generate a first IMA model corresponding to an aircraft system of an aircraft and generate an IMA system model corresponding to the aircraft by generating a plurality of IMA models including the first IMA model. The example apparatus further includes an interface validator to validate the IMA system model by comparing an output of the IMA system model to a validation output, an interface exporter to generate manufacturing build instructions of the aircraft system when the IMA system model is validated, and a report generator to initiate production of the aircraft system based on the manufacturing build instructions.

An example computer implemented method includes importing first integrated modular architecture (IMA) protocol definitions into a first computer modeling environment to generate a plurality of libraries based on the first IMA protocol definitions, generating a plurality of IMA model objects based on the plurality of libraries, importing ones of the plurality of IMA model objects into the first computer modeling environment to generate a first IMA model corresponding to an aircraft system of an aircraft, generating an IMA system model corresponding to the aircraft by generating a plurality of IMA models including the first IMA model, validating the IMA system model by an output of the IMA system model to a validation output, in response to validating the IMA system model based on the comparison, generating manufacturing build instructions of the aircraft system, and initiating production of the aircraft system based on the manufacturing build instructions.

An example non-transitory computer readable storage medium including instructions that, when executed, cause a machine to at least import first integrated modular architecture (IMA) protocol definitions into a first computer modeling environment to generate a plurality of libraries based on the first IMA protocol definitions, generate a plurality of IMA model objects based on the plurality of libraries, import ones of the plurality of IMA model objects into the first computer modeling environment to generate a first IMA model corresponding to an aircraft system of an aircraft, generate an IMA system model corresponding to the aircraft by generating a plurality of IMA models including the first IMA model, validate the IMA system model by comparing an output of the IMA system model to a validation output, generate manufacturing build instructions of the aircraft system when the IMA system model is validated based on the comparison, and initiate production of the aircraft system based on the manufacturing build instructions.

DETAILED DESCRIPTION

Figure 1:
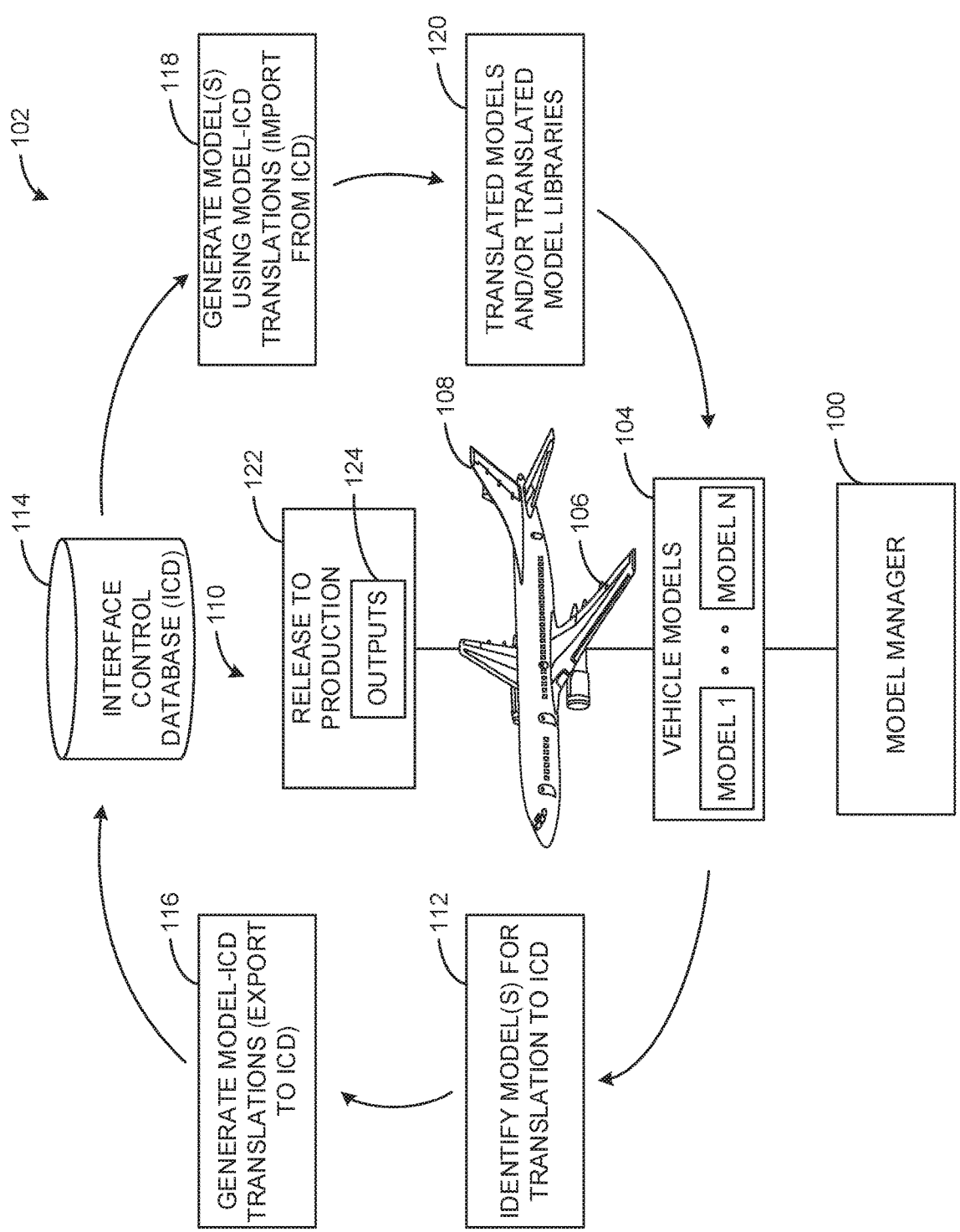
FIG. 1 depicts an example system workflow to generate a plurality of example aircraft system models associated with an example aircraft using an integrated modular architecture (IMA).

Typical aircraft use highly-integrated aircraft systems to improve control, monitoring, and operation of the aircraft systems. As used herein, the term "aircraft system" refers to a sub-division of an aircraft (e.g., an electrical system, a mechanical system, an electro-mechanical system, etc., and/or a combination thereof) including one or more coupled (e.g., electrically coupled, electro-mechanically coupled, mechanically coupled, etc.) components (e.g., electrical components, mechanical components, electro-mechanical components, etc.) operative to perform an aircraft function. For example, an aircraft system can correspond to a component such as a motor, a controller, a remote electronics unit, etc.

As typical aircraft systems include an increasing number of electrically-interconnected components, validating a design of the aircraft system becomes increasingly complex. For example, designing an aircraft system can include evaluating interfaces and interconnections between the aircraft system and other aircraft systems electrically coupled to the aircraft system. Computer-generated models can be used to analyze the interconnections and validate the aircraft system designs prior to being released for use in manufacturing.

In prior computer-generated model analysis implementations, a use of computer-generated models to analyze a plurality of interconnected aircraft systems was problematic. For example, a first computer-generated model used to simulate a first aircraft system may have used a different architecture, different analysis criteria, a different timing analysis, etc., compared to a second aircraft system modeled using a second computer-generated model. In such an example, an attempt to successfully integrate the first and the second computer-generated models to validate interconnections between the first and the second aircraft systems was unlikely.

Similarly, in prior computer-generated model analysis implementations, an attempt to successfully integrate and/or otherwise communicatively couple a first model based on a first computer modeling environment (e.g., MATLAB® Simulink®, National Instruments® LABVIEW™, OMG SysML®, etc.) and a second model based on a second computer modeling environment created compatibility complications. For example, the compatibility complications are necessarily rooted in computer technology because configurations, definitions, functionalities, etc., can be fundamentally different between computer modeling environments and, thus, create compatibility problems between model interfaces during integration.

In prior implementations, attempts to resolve compatibility problems between models based on different computer modeling environments resulted in erroneous data and translation errors. In some prior implementations, a model developer created a translation application or interface to translate data between models using different computer modeling environments. However, the manual process of creating the translation interface was prone to human error as large-scale models created many opportunities to insert typographical errors by the model developers. Similarly, a model developer revising an aspect of one of the models without updating the translation interface to account for the revised aspect led to breaking the overall system model, generating erroneous data, etc.

In some prior implementations, models associated with translation interfaces were not readily portable between applications. For example, a model associated with a first translation interface in a first application would require creating a second translation interface when the model moved to a second application because the translation interfaces were application and/or computer modeling environment specific. As a result, rework occurred when attempting to re-use models across different applications and different computer modeling environments, leading to increased development, validation, and testing time for project development.

Examples disclosed herein are operative to generate an Integrated Modular Architecture (IMA) model. An IMA model is a computer-generated model used to simulate and/or otherwise validate a function associated with a vehicle system (e.g., an aircraft system) or vehicle sub-system (e.g., an aircraft sub-system). In some examples, the IMA model is based on the Integrated Modular Avionics concept, which on some aircraft, can replace numerous separate processors and line replaceable units (LRU) with fewer, more centralized IMA processing units. In some aircraft, a common core system includes one or more common core resource (CCR) cabinets or IMA processing units including one or more processing modules, power control modules, network switches, application specific modules, etc., and/or a combination thereof.

In some disclosed examples herein, an IMA model manager apparatus transforms (e.g., automatically transforms) requirements and specifications of a vehicle (e.g., an aircraft, an unmanned aerial vehicle, a land-based vehicle, etc.) stored in a data source domain to a plurality of vehicle models (e.g., 100 vehicle models, 1000, vehicle models, 10,000 vehicle models, etc.) in a language specific domain. For example, each one of the plurality of vehicle models can include a plurality of abstractions or software representations of the requirements and specifications in a computer modeling environment.

In some examples, the IMA model manager apparatus enables interface control database (ICD) definition, maintenance, validation, analysis, and integration with functional requirements in a native design tool when used in a model-based development approach through automation of large scale model generation and, thus, eliminates errors and reduces project development time by reducing an amount of time to develop translation interfaces associated with different computer modeling environments. As used herein, the term "interface control database" refers to a repository including information associated with interface information (e.g., communication addresses, communication nodes, device addresses, device identifiers, physical connection information (e.g., electrical contact locations, pinout details, wiring information, etc.), etc.) associated with an interface between sub-systems, systems, etc., and/or a combination thereof.

In some examples, the CCR cabinets of a vehicle contain the same or substantially similar hardware. However, each one of the CCR cabinets can provide different functionality and can be provided to the vehicle manufacturer by different contractors or suppliers. Integration between suppliers or between a supplier and the vehicle manufacturer can create problems even if they are using the same CCR cabinets (e.g., the same hardware). Examples disclosed herein can alleviate such problems by generating IMA models with standardized definitions for communicating parameters and signals between IMA models. In some examples, the IMA models with standardized definitions are embedded with metadata to translate and/or otherwise transform input data from and/or output data to ICDs, model libraries, etc.

In some examples disclosed herein, a language neutral model (LNM) operating in a language neutral domain is deployed as a buffer between ICDs and language specific models (e.g., IMA models operating in a modeling environment). In some examples, the LNM operates as a buffer between an ICD and a computer modeling environment. For example, the IMA model manager apparatus can generate an IMA model by generating an IMA library including IMA model objects based on information included in the ICD. For example, the IMA model manager apparatus can import the information from the ICD via the LNM and populate definitions of the IMA model objects with the imported information.

In some examples, the IMA model manager apparatus can generate the IMA model by importing the IMA model objects from the IMA library into a computer modeling environment to perform a design validation, a functional test, etc. For example, the LNM can obtain the corresponding information from the ICD using an ICD translator mechanism based on a first data formatting schema of the ICD and transmit the information to the computer modeling environment using a language specific model translator mechanism based on a second data formatting schema of the computer modeling environment. In such an example, if an ICD is changed, a new translation mechanism can be developed to convert the new ICD information to the LNM format while leaving the computer modeling environment or the second translator unaffected by the new ICD.

FIG. 1 depicts an example model manager 100 executing an example model generation system 102 to generate one or more example vehicle models 104 using IMA. For example, the model manager 100 can be an IMA model manager. For example, the model generation system 102 can be an IMA model generation system. For example, the vehicle models 104 can be aircraft system models, unmanned aerial vehicle system models, land-based vehicle models, etc. In FIG. 1, the vehicle models 104 are models including one or more computer-based model objects associated with an example aircraft system 106 included in an example aircraft 108. For example, the aircraft system 106 can be an aileron actuation system, a flap actuation system, etc., including one or more electrical components, electromechanical components, hydraulic components, etc. Although the aircraft 108 is depicted in FIG. 1, additionally or alternatively, the examples disclosed herein can be applicable to any other type of vehicle such as a land vehicle (e.g., a car, a bus, a truck, etc.), an unmanned aerial vehicle, a water vehicle (e.g., a boat, a submarine, etc.), etc.

In FIG. 1, the model generation system 102 implements a model management workflow 110 including a first operation 112. Alternatively, the model management workflow 110 can begin or execute at a different block or operation depicted in FIG. 1. Alternatively, the model management workflow 110 can include fewer or more operations than depicted in FIG. 1. At the first operation 112, the model manager 100 identifies model(s) for translation to an ICD 114. For example, the model manager 100 can identify a computer-based model associated with an aircraft system component to be defined in an ICD such as an LRU, a remote data concentrator (RDC), a general processing module (GPM) included in a CCR cabinet, etc.

In the illustrated example of FIG. 1, the model management workflow 110 includes a second operation 116, at which the model manager 100 generates model-ICD translations. For example, the model manager 100 can generate mappings between model definitions (e.g., model input parameters, model output parameters, etc.) and ICD definitions. The ICD definitions can correspond to data fields, data structures, etc., based on a data format of the ICD. For example, the model manager 100 can generate the translations by assigning standard data fields to the aircraft system component such as a functional status, a parameter, a data set, a message structure, a communication port, etc. The model manager 100 can populate the standard data fields using information corresponding to the aircraft system component. In response to populating the standard data fields, the model manager 100 can export the translations to the ICD 114 for storage and future retrieval by the model manager 100.

In some examples, the model manager 100 generates the translations by mapping the aircraft system component to a reference aircraft system component (e.g., a previously defined aircraft system component) in the ICD 114. For example, in response to determining a match of the aircraft system component to a reference aircraft system component, the ICD 114 can return definitions to be assigned and/or otherwise applied to the aircraft system component by the model manager 100. For example, the model manager 100 can assign and/or otherwise apply the definitions associated with the reference aircraft system component to the aircraft system component.

In FIG. 1, the model management workflow 110 includes a third operation 118, at which the model manager 100 generates model(s) using the model-ICD translations. For example, the model manager 100 can generate an IMA model for an aircraft system component of interest. The model manager 100 can query the ICD 114 for ICD model objects and corresponding ICD definitions associated with the aircraft system component of interest in a computer modeling environment (CME). In response to the query, the ICD 114 can return the ICD model objects and the model manager 100 can convert the ICD model objects to CME model objects. The model manager 100 can translate the ICD definitions associated with the ICD model objects to CME definitions associated with the CME model objects.

In some examples, the model manager 100 validates the ICD definitions by comparing configuration parameters included in the returned ICD definitions to one or more IMA definition rules. In response to the returned ICD definitions satisfying the one or more IMA definition rules, the model manager 100 can generate translated models 120 and/or translated model libraries 120. For example, the model manager 100 can generate one or more model objects, logic conditions, connection points, etc., included in and/or associated with the IMA model.

In FIG. 1, the model manager 100 executes the vehicle model(s) 104 using the translated models 120 and/or the translated model libraries 120 to generate model outputs. For example, the model manager 100 can simulate a function or a mode of operation of the aircraft system 106 of the aircraft 108 by executing the vehicle model(s) 104 to generate model outputs.

In FIG. 1, the aircraft system 106 is released to production at a fourth operation 122 by generating example outputs 124. For example, in response to successfully validating an operation of the aircraft system 106 by simulating the corresponding vehicle model(s) 104, the model manager 100 can generate an output such as an alert, a report, etc., indicating that the aircraft system 106 is released for assembly, construction, manufacturing, etc.

In some examples, the outputs 124 are supply chain build instructions. For example, the model manager 100 can generate instructions to be executed by a supply chain computing system to initiate an ordering of components, an assignment of labor, etc., to build the aircraft system 106 associated with an IMA system model including one or more of the vehicle models 104. In another example, the model manager 100 can generate a report including the supply chain build instructions. For example, the supply chain build instructions can include drawings, requirement documents, specification documents, ICD documents, etc., associated with building the aircraft system 106 associated with the IMA system model.

In some examples, the outputs 124 are manufacturing build instructions. For example, the model manager 100 can generate instructions to be executed by a manufacturing computing system to initiate a manufacturing of components, an assignment of labor, etc., to build the aircraft system 106 associated with the IMA system model including one or more of the vehicle models 104. In another example, the model manager 100 can generate a report including the manufacturing build instructions. For example, the manufacturing build instructions can include drawings, requirement documents, specification documents, ICD documents, etc., associated with building the aircraft system associated with the IMA system model 754.

In some examples, the outputs 124 are machine readable instructions. For example, the model manager 100 can generate computer readable instructions (e.g., binary code, hardware logic instructions, etc.) based on the translated models 120 to be deployed by the aircraft 108, a flight simulator associated with the aircraft 108, etc. For example, the outputs 124 can be binary code to implement the functions included in the translated models 120. One or more hardware circuits can deploy the binary code to operate one or more aircraft systems 106 of the aircraft 108 during flight. Alternatively, a flight simulator can execute the binary code to simulate one or more aircraft systems 106 of the aircraft 108 during flight.

Figure 2:
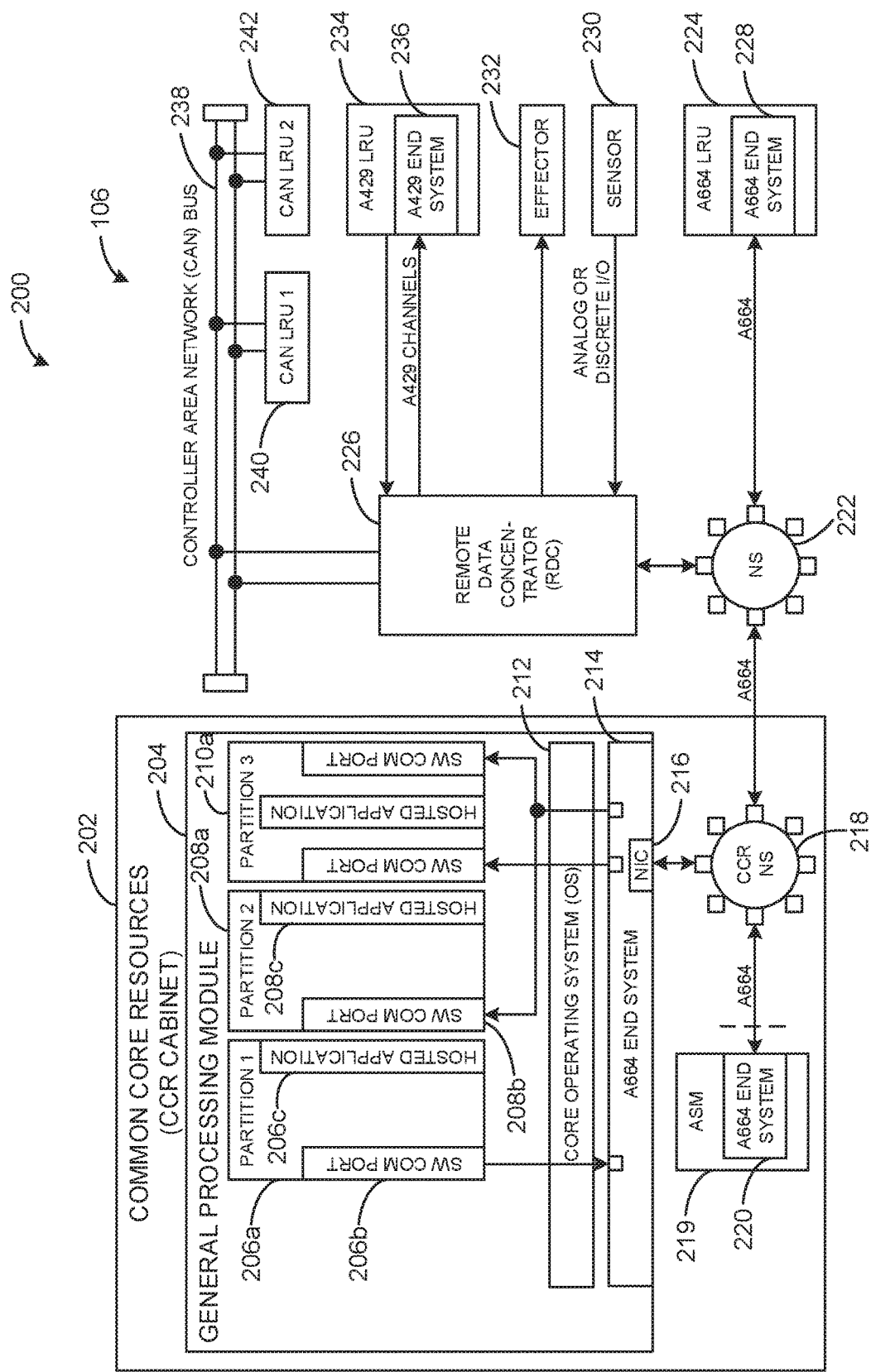
FIG. 2 is a schematic illustration of an example aircraft network used to communicatively couple example aircraft control hardware of the aircraft of FIG. 1.

FIG. 2 is a schematic illustration of an example aircraft network 200 used to communicatively couple example aircraft control hardware of the aircraft 108 of FIG. 1. The aircraft network 200 of FIG. 2 is based on IMA, which includes common core resources included in an example common core resource (CCR) cabinet 202. In FIG. 2, the CCR cabinet 202 includes an example general processing module (GPM) 204, which is a computing hardware platform that can include one or more processors, one or more graphical processing units, one or more network interfaces, etc., and/or a combination thereof.

The GPM 204 of FIG. 2 includes example software partitions 206a, 208a, 210a, where each of the software partitions 206a, 208a, 210a can execute different aircraft system functions. Partition 1 206a can be a first partition included in the GPM 204, Partition 2 208a can be a second partition included in the GPM 204, and Partition 3 210a can be a third partition included in the GPM 204. In FIG. 2, Partition 1 206a includes an example software communication port (SW COM PORT) 206b and a first example hosted application 206c. The software communication port 206b can correspond to one or more queueing and/or sampling ports uses to couple Partition 1 206a to a first example A664 End System 214. For example, the software communication port 206b of FIG. 2 can be a software abstraction of an ARINC 653 communication protocol receiving port, and ARINC 653 communication protocol transmission port, etc., to facilitate communication between the GPM 204 and another component included in the aircraft network 208.

In FIG. 2, the first hosted application 206c of FIG. 2 is a software application capable of executing and/or otherwise performing a software task associated with an aircraft system function. Similarly, in FIG. 2, Partition 2 208a includes a second example software communication port 208b and a second example hosted application 208c. For example, the software communication port 208b can be a software abstraction of an ARINC 653 communication protocol receiving port, an ARINC 653 communication protocol transmission port, etc. In some examples, the second hosted application 208c is the same software application as the first hosted application 206c, while in other examples, the first and second hosted applications 206c, 208c are different.

In FIG. 2, the GPM 204 includes an example core operating system (OS) 212 and a first A664 End System 214. The core OS 212 of FIG. 2 is a base operating system on which the software partitions 206a, 208a, 210a operate. The first A664 End System 214 includes an example network interface controller (NIC) 216, which is a hardware controller capable of receiving data packets from an example CCR network switch (NS) 218 and abstracting the received data packets for use by the software partitions 206a, 208a, 210a. Similarly, the first A664 End System 214 can receive abstractions of data packets from the software partitions 206a, 208a, 210a and generate data packets based on the abstractions to be transmitted via the CCR NS 218. The CCR NS 218 is a fiber-optic network switch. Alternatively, other types of network switches can be used such as copper-based Ethernet switches.

In the illustrated example of FIG. 2, the CCR NS 218 of the CCR cabinet 202 is communicatively coupled to an example application specific module (ASM) 219 including a second A664 End System 220. The ASM 219 is hardware and/or software to obtain, transmit, and/or process data via the second A664 End System 220. The CCR NS 218 couples the CCR cabinet 202 to the aircraft network 200 via an example NS 222. The NS 222 facilitates communication via the ARINC 664 (A664) communication protocol. For example, the NS 222 can facilitate communication between an A664 line-replaceable unit (LRU) 224 and a remote data concentrator (RDC) 226 via the A664 communication protocol. However, alternative communication protocols such as ARINC 429 (A429) can be used.

In FIG. 2, the A664 LRU 224 is modular hardware including one or more processors, one or more network interfaces, etc., capable of facilitating A664 communication using a third example A664 End System 228. The RDC 226 of FIG. 2 is a high-speed, modular analog-to-digital and/or digital-to-analog conversion computing devices enabled to process and format effector data, sensor data, etc., into a common digital format over a communication protocol such as A429, A664, etc. For example, as depicted in FIG. 2, the RDC 226 obtains data (e.g., an analog signal, a discrete signal, etc.) from an example sensor 230 and transmits a command (e.g., a control signal) to an example effector 232. In FIG. 2, the RDC 226 transmits data to and receives data from an A429 LRU 234 including an A429 End System 236 via A429 communication protocol. In FIG. 2, the RDC 226 is communicatively coupled to an example controller area network (CAN) bus 238 (e.g., a CAN communication protocol-based bus). In FIG. 2, the CAN bus 238 is communicatively coupled to a first example CAN LRU 240 and a second example CAN LRU 242 (e.g., an LRU enabled to communicate via CAN, a CAN-based LRU, etc.).

Figure 3:
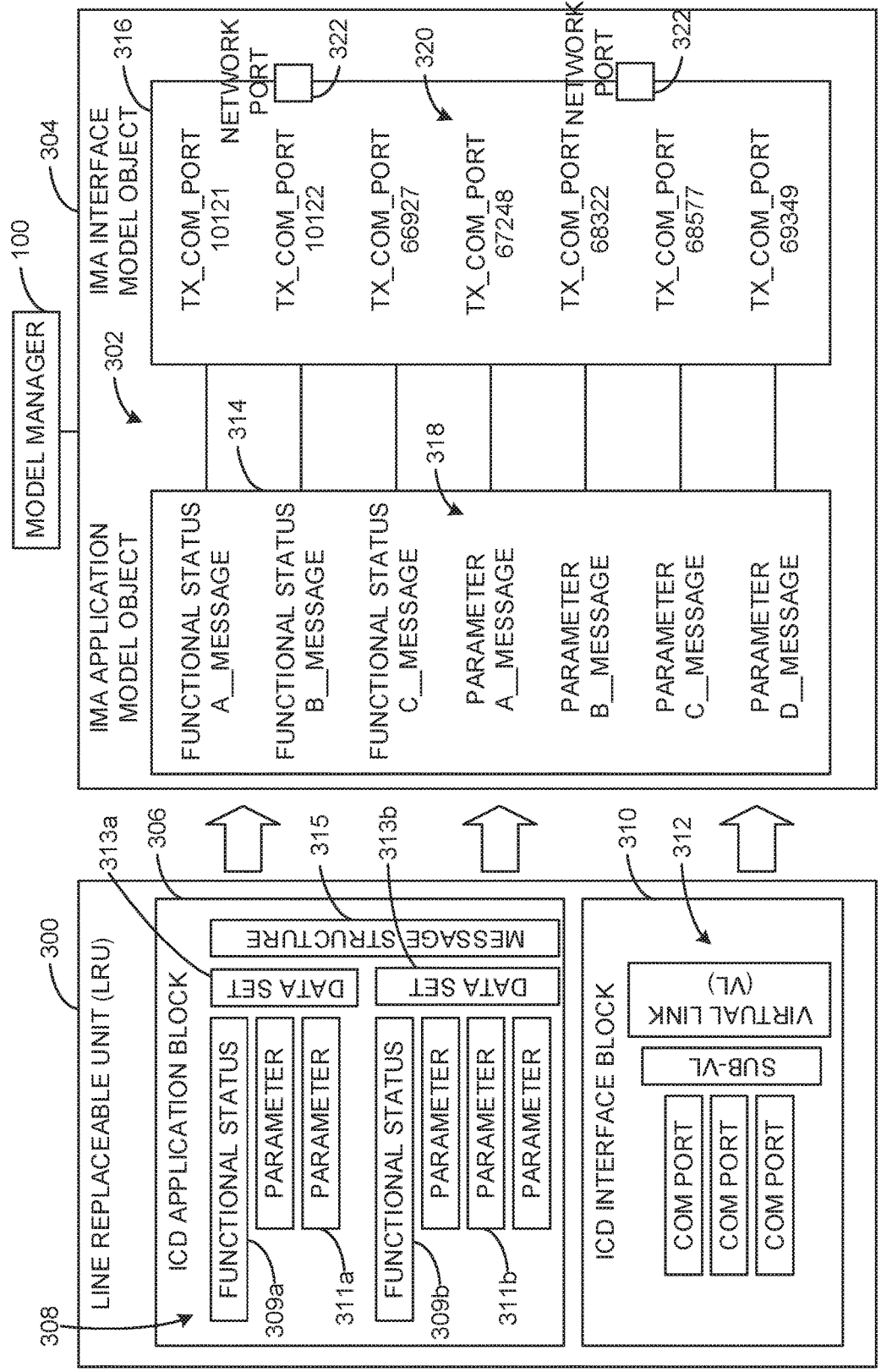
FIG. 3 depicts an example line-replaceable unit (LRU) interface control database (ICD) object and a corresponding example IMA model of the LRU ICD object in an example modeling environment.

FIG. 3 depicts an example LRU ICD object 300 and a corresponding example model 302 in an example modeling environment 304. In FIG. 3, the LRU ICD object 300 is a software abstraction included in the ICD 114 of FIG. 1 capable of suppressing low-level hardware details with a high-level interface. For example, the LRU ICD object 300 can correspond to a high-level representation of hardware and/or software corresponding to the A664 LRU 224, the A429 LRU 234, the first CAN LRU 240, or the second CAN LRU 242 of FIG. 2. Although the LRU ICD object 300 of FIG. 3 corresponds to an LRU, alternatively, any other hardware and/or software can be abstracted or represented as described in connection with FIG. 3.

In FIG. 3, the LRU ICD object 300 includes an example ICD application block 306, which includes example ICD application definitions 308. The ICD application block 306 is a representation of functionality performed by software (e.g., application software) executing on the LRU. The ICD application definitions 308 represent data structures of control logic functions of the LRU based on one or more data formats used by the ICD 114 of FIG. 1. In FIG. 3, the ICD application definitions 308 include a first functional status definition 309a, a second functional status definition 309b, a first parameter definition 311a, a second parameter definition 311b, a first data set definition 313a, a second data set definition 313b, and a message structure definition 315. Alternatively, the ICD application definitions 308 can include fewer or more than the functional status definitions 309a, 309b, the parameter definitions 311a, 311b, the data set definitions 313a, 313b, and/or the message structure definitions 315 shown in the illustrated example of FIG. 3.

In FIG. 3, the parameter definitions 311a, 311b can correspond to an encapsulation of signal data. For example, the parameter definitions 311a, 311b can include a data value in any type of data format. In FIG. 3, the data set definitions 313a, 313b can provide a coherency associated with a plurality of the parameter definitions 311a, 311b. For example, the first data set definitions 313a can correspond to interface information associated with a first data source and the second data set definitions 313b can correspond to interface information associated with a second data source. For example, the parameter definitions 311a, 311b are associated with corresponding functional status definitions 309a, 309b and can correspond to the same data but from a different source. For example, the first parameter definition 311a can correspond to the first functional status definition 309a and the second parameter definition 311b can correspond to the second functional status definition 309b. The first parameter definition 311a can correspond to a status of an aircraft system obtained from the CAN LRU 1 240 of FIG. 2. The second parameter definition 311b can correspond to the same status but obtained from the CAN LRU 2 242 of FIG. 2.

In the illustrated example of FIG. 3, the functional status definitions 309a, 309b can correspond to metadata associated with the data set definitions 313a, 313b. For example, the functional status definitions 309a, 309b can describe a validity of associated data (e.g., the parameter definitions 311a, 311b) by evaluating and/or otherwise determining a state of the associated data. For example, a state can be a "Fail/Warn" state, a "No Computed Data" state, a "Normal Operation State" state, or a "Functional Test" state. For example, the first functional status definition 309a can have a "Fail/Warn" state that corresponds to the first parameter definition 311a having an unverified data value because the CAN LRU 1 240 is non-responsive while the second parameter definition 311b has a verified data value.

In some examples, the "Fail/Warn State" provisions a warning indicating that the source of the first parameter definition 311a is non-responsive. In response to the first parameter definition 311a being non-responsive, the model manager 100 can select the verified data value associated with the second parameter definition 311b. In some examples, the first functional status definition 309b can have a "No Computed Data" state that corresponds to the first parameter definition 311a not having an available data value to provide to the LRU ICD object 300. In some examples, the first functional status definition 309b can have a "Normal Operation State" when a verified data value is associated with the first parameter definition 311a. In some examples, the first functional status definition 309b can have a "Functional Test" state when a data value associated with the first parameter definition 311a is calculated during a model test operation.

In FIG. 3, the message structure definition 315 can correspond to an assembly or composition of one or more data set definitions associated with the ICD application block 306. For example, the message structure definition 315 can include all the data set definitions 313a, 313b of the ICD application block 306. Additionally or alternatively, the ICD application definitions 308 can include fewer or more than the ICD application definitions 308 depicted in FIG. 3.

In some examples, each LRU included in the ICD 114 has the same ICD application definitions 308 with different values. For example, the A664 LRU 224 of FIG. 2 can include the same ICD application definitions 308 as the A429 LRU 234 of FIG. 2, however, the A664 LRU 224 can have different values for the functional status definitions 309a, 309b, the parameter definitions 311a, 311b, the data set definitions 313a, 313b, etc., compared to the A429 LRU 234. In such examples, different types of LRU can be quickly and accurately instantiated in the ICD 114 of FIG. 1 during the second operation 116 of FIG. 1 by using standardized ICD application definitions 308 for every like or substantially similar component. For example, each LRU can have the same ICD application definitions 308, each A664 end system can have the same ICD application definitions as other A664 end systems, etc.

In FIG. 3, the LRU ICD object 300 includes an example ICD interface block 310, which includes ICD interface definitions 312. The ICD interface block 310 is a representation of communication functions performed by a communication end system as defined by the ICD. For example, the ICD interface block 310 can correspond to an abstraction of hardware and/or software corresponding to the first A664 End System 214, the second A664 End System 220, the third A664 End System 228, or the A429 End System 236 of FIG. 2.

In FIG. 3, the ICD interface definitions 312 represent data structures associated with communication functions of the LRU based on one or more data formats used by the ICD 114 of FIG. 1. In FIG. 3, the ICD interface definitions 312 include a communication (COM) port definition, a virtual link (VL) definition, and a sub-VL definition. In FIG. 3, the COM port definition is a socket. For example, the COM port definition can correspond to a preconfigured communication socket that provides queueing of transmitted messages to or received messages from a model object, an application, a computing device, etc. For example, the COM port definition can correspond to a queueing port or a sampling port uses to couple a software partition such as Partition 1 206a of FIG. 2 to a communication end system such as the first A664 End System 214 of FIG. 2.

In FIG. 3, the VL definition represents a switched packet routing scheme based on a selected communication protocol. For example, the VL definition can correspond to a switched packet routing scheme defined in the A664 Part 7 standard where the destination MAC address is used to implement a tree-like route per VL identification designator. In FIG. 3, the sub-VL definition represents a process used by a transmitter to invoke an encapsulation of data by accessing the VL definition prior to transmitting the data. For example, the sub-VL definition can include an instruction to encapsulate data from the COM port to a data format used by a transmitter such as the NIC 216 of FIG. 2 to transmit the encapsulated data. Additionally or alternatively, the ICD interface definitions 312 can include fewer or more than the definitions depicted in FIG. 3.

In the illustrated example of FIG. 3, the model 302 is an IMA model including IMA model objects 314, 316. In FIG. 3, the model manager 100 generates the model 302 in the modeling environment 304 by importing the IMA model objects 314, 316 into the modeling environment 304 and populating the IMA definitions 318, 320 based on translating information from the LRU ICD object 300 to the modeling environment 304.

In FIG. 3, the model 302 is the corresponding abstraction of the LRU ICD object 300 when translated and/or otherwise imported into the modeling environment 304. In FIG. 3, the modeling environment 304 is MATLAB® Simulink®. Alternatively, any other computer-based modeling environment can be used. The model 302 is generated when the LRU ICD object 300 is ported and/or otherwise converted from a first data format such as an ICD data format to a second data format, where the second data format is specific to the modeling environment 304. However, in prior implementations, when the LRU ICD object 300 is converted to a different modeling environment than the modeling environment 304 of FIG. 3, a second model is generated, which can be different than the model 302 of FIG. 3. In some examples, integration problems occur when attempting to couple the model 302 of FIG. 3 to the second model. Examples disclosed herein resolve the integration problems of such prior implementations.

In FIG. 3, the model 302 includes the IMA model objects 314, 316 to simulate and/or otherwise validate an aircraft system design. The IMA model objects 314, 316 include the IMA application model object 314 and the IMA interface model object 316. The IMA application model object 314 of FIG. 3 includes example IMA application definitions 318 associated with the ICD application definitions 308 of the LRU ICD object 300. In FIG. 3, the IMA application definitions 318 represent metadata parameters that are associated with the message structure definition 315. For example, the IMA application definition "FUNCTIONAL STATUS A_MESSAGE" of the IMA application model object 314 can correspond to the "FUNCTIONAL STATUS" ICD application definition defined in the ICD application definitions 308, where the IMA application definition is configured based on the data set definitions 313a, 31b and the message structure definition 315 included in the ICD application definitions 308. The IMA application definitions 318 correspond to abstractions of values based on executing application logic. For example, the IMA application definition "FUNCTIONAL STATUS A_MESSAGE" can correspond to an output value of a pressure sensor calculation function, which calculates an engineering value for a pressure sensor measurement based on one or more conversion or scaling functions.

The IMA interface model object 316 of FIG. 3 includes example IMA interface definitions 320 associated with the ICD interface definitions 312. For example, the IMA interface definition "TX COM PORT 10121" can correspond to the "COM PORT" ICD interface definition defined in the ICD interface definitions 312, where the IMA interface definition is configured based on the SUB-VL and the VL ICD interface definitions defined in the ICD interface definitions 312. The IMA interface definitions 320 correspond to abstractions of software ports used to interconnect different model blocks and/or different models.

In FIG. 3, the IMA interface definitions 320 can correspond to a socket application programming interface (API) such as a send( )function call, a recv( )function call, a write( )function call, a read( )function call, a recvfrom( )function call, etc. For example, the IMA interface definition "TX_COM_PORT_10121" can correspond to a link or a pointer included in another model block and/or another model that receives the value of the corresponding "FUNCTIONAL STATUS A_MESSAGE" to perform a function or execute a software logic routine.

In FIG. 3, the IMA interface model object 316 includes example network port model objects 322 to simulate a coupling of a software layer of the LRU to a hardware layer of the LRU. For example, the network port model objects 322 can be A664 network port model objects. For example, the network port model objects 322 can simulate generating data packets using the IMA application definitions 318 coupled to the IMA interface definitions 320 to be transmitted via A664 communication protocol.

Figure 4:
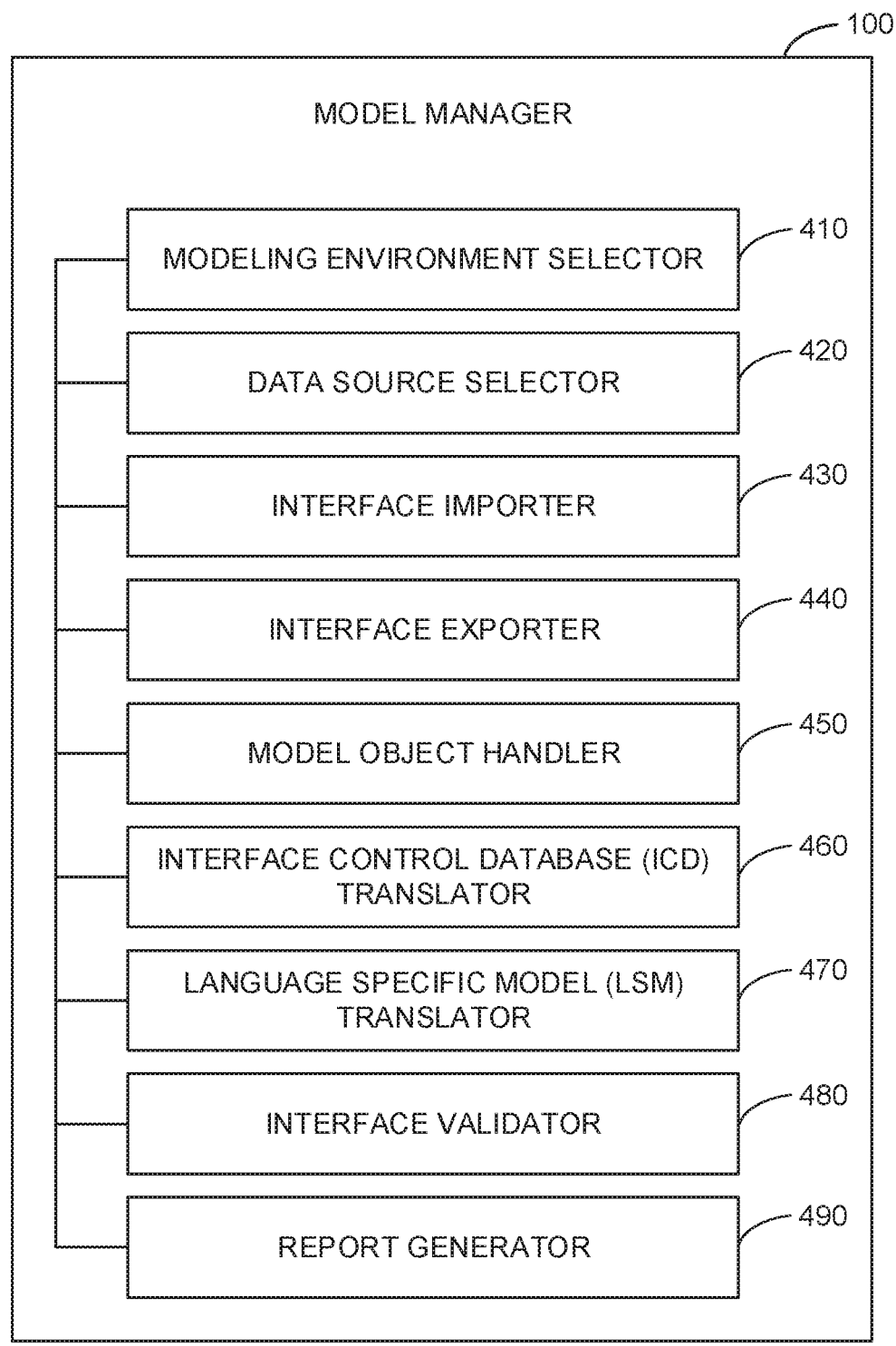
FIG. 4 is a block diagram of an example implementation of an example model manager apparatus to implement the examples disclosed herein.

FIG. 4 is a block diagram of an example implementation of the model manager 100 of FIGS. 1 and 3 to implement the examples described herein. In the illustrated example of FIG. 4, the model manager 100 includes an example modeling environment selector 410, an example data source selector 420, an example interface importer 430, an example interface exporter 440, an example model object handler 450, an example ICD translator 460, an example language specific model (LSM) translator 470, an example interface validator 480, and an example report generator 490.

In the illustrated example of FIG. 4, the model manager 100 includes the modeling environment selector 410 to determine a modeling environment to generate an IMA model such as the model 302 of FIG. 3. In some examples, the modeling environment selector 410 selects an LSM environment to generate an IMA model associated with the aircraft system 106 of the aircraft 108 of FIG. 1. For example, the modeling environment selector 410 can select MATLAB® Simulink® to generate the model 302. In some examples, the modeling environment selector 410 determines whether to generate another model. For example, the modeling environment selector 410 can determine to generate a second model after the model 302 has been generated, validated, and/or exported to the ICD 114 of FIG. 1.

In the illustrated example of FIG. 4, the model manager 100 includes the data source selector 420 to determine an interface control data source associated with an aircraft system to model. In some examples, the interface control data source is a database, a spreadsheet (e.g., a golden spreadsheet), etc., or any other type of interface control document or information. For example, the model manager 100 can select the ICD 114 of FIG. 1.

In the illustrated example of FIG. 4, the model manager 100 includes the interface importer 430 to retrieve and/or otherwise obtain data from an interface control data source. In some examples, the interface importer 430 obtains definitions from the interface control data source to populate a top-level abstraction model such as the model 302 of FIG. 3. For example, the interface importer 430 can obtain the ICD application definitions 308, the ICD interface definitions 312, etc., associated with the IMA application definitions 318, the IMA interface definitions 320, etc., of FIG. 3 from the ICD 114 of FIG. 1. In some examples, the interface importer 430 obtains ICD blocks from the interface control data source to populate the model 302. For example, the interface importer 430 can obtain the ICD application block 306, the ICD interface block 310, etc., from the ICD 114 of FIG. 1. In some examples, the interface importer 430 generates model libraries. For example, the interface importer 430 can generate one or more libraries of the modeling environment 304 in response to a generation of the IMA application definitions 318, the IMA interface definitions 320, etc.

In the illustrated example of FIG. 4, the model manager 100 includes the interface exporter 440 to transmit and/or otherwise export data associated with an IMA model. In some examples, the interface exporter 440 exports IMA definitions to an ICD. For example, the interface exporter 440 can export one or more of the IMA application definitions 318, the IMA interface definitions 320, etc., from the modeling environment 304 of FIG. 3 to the ICD 114 of FIG. 1. In some examples, the interface exporter 440 exports IMA model objects to the ICD. For example, the interface exporter can export one or more of the IMA application model object 314, the IMA interface model object, etc., from the modeling environment 304 to the ICD 114. In some examples, the interface exporter 440 exports an IMA model such as the model 302 of FIG. 3 from the modeling environment 304 to the ICD 114.

In some examples, the interface exporter 440 generates outputs based on an IMA model. For example, the interface exporter 440 can generate machine readable instructions (e.g., binary code) based on the model 302 of FIG. 3. For example, the interface exporter 440 can compile and/or otherwise convert information associated with the model 302 into computer executable code. For example, the interface exporter 440 can compile the IMA application model object 314 and associated control logic, the IMA interface model object 316 and associated control logic, the IMA application definitions 318, the IMA interface definitions 320, etc., and/or a combination thereof into machine readable instructions that can be executed by the aircraft system 106, the aircraft 108, a flight simulator associated with the aircraft 108, etc. In some examples, the interface exporter 440 deploys the machine readable instructions to a vehicle and/or a vehicle simulator. For example, the interface exporter 440 can deploy the machine readable instructions to the aircraft system 106, the aircraft 108, etc., and/or a flight simulator associated with the aircraft system 106, the aircraft 108, etc. In some examples, the interface exporter 440 directs, instructs, and/or otherwise causes an operation of the vehicle and/or the vehicle simulator. For example, the interface exporter 440 can instruct the aircraft system 106, the aircraft 108, etc., to replace existing machine readable instructions included in the aircraft system 106, the aircraft 108, etc., with the machine readable instructions generated by the interface exporter 440. In such an example, the interface exporter 440 can cause the aircraft system 106, the aircraft 108 to perform an operation such as a flight operation, a simulated flight operation, etc., using the machine readable instructions generated by the interface exporter 440.

In some examples, the interface exporter 440 generates supply chain and manufacturing build instructions based on the model 302 of FIG. 3. For example, the interface exporter 440 can generate requirements, specifications, etc., based on information included in the ICD 114 of FIG. 1, the model 302 of FIG. 3, etc., indicating that the aircraft system 106 associated with the model 302 can be released for production at the fourth operation 122 of FIG. 1. For example, the interface exporter 440 can direct or instruct one or more computing devices or systems associated with manufacturing and supply chain of the aircraft system 106 and/or, more generally, the aircraft 108 to initiate building one or more prototypes, one or more production line assemblies, etc., of the aircraft system 106, the aircraft 108, etc. For example, the interface exporter 440 can initiate a manufacturing of a vehicle system associated with an IMA system model. For example, the interface exporter 440 can initiate production of the aircraft system 106 and/or the aircraft 108 based on the generated supply chain and/or manufacturing build instructions.

In the illustrated example of FIG. 4, the model manager 100 includes the model object handler 450 to import, configure, and/or modify models included in a modeling environment. In some examples, the model object handler 450 imports a model block of interest to process. For example, the model object handler 450 can import the IMA application model object 314, the IMA interface model object 316, etc., into the modeling environment 304 to process. In some examples, the model object handler 450 connects two or more model objects associated with an IMA model. For example, the model object handler 450 can connect or communicatively couple the IMA application model object 314 and the IMA interface model object 316 of FIG. 3 to create inter-block relations in the model 302.

In some examples, the model object handler 450 selects a model object to process and/or determine whether to select another model object to process. In some examples, the model object handler 450 adjusts a definition associated with an IMA model. For example, the model object handler 450 can adjust a definition corresponding to the IMA application definition "FUNCTIONAL STATUS A_MESSAGE" included in the IMA application definitions 318 of FIG. 3. In some examples, the model object handler 450 generates a new model object in the modeling environment 304 of FIG. 3. For example, the model object handler 450 can generate a new model object by creating a blank model object and including one or more IMA application definitions, one or more IMA interface definitions, etc., in the modeling environment 304 and subsequently generate new model object relations and model object connections associated with the new model object. For example, the model objects can correspond to IMA components. The model object relations and model object connections can correspond to software connections from a software partition to an end system. For example, the model object relations and model object connections can correspond to queueing and sampling ports that communicatively couple the first through third software partitions 206a, 208a, 210a of FIG. 2 to the first A664 End System 214 of FIG. 2. In some examples, the model object handler 450 can generate an IMA system model in response to generating one or more IMA models.

In the illustrated example of FIG. 4, the model manager 100 includes the ICD translator 460 to transform and/or otherwise convert data included in the ICD 114 of FIG. 1 from an ICD data format to a language neutral model (LNM) data format. For example, the ICD translator 460 can be an ICD-LNM translator. The ICD translator 460 can convert (1) ICD application definitions 308 from the ICD 114 in an ICD data format associated with the ICD 114 to (2) LNM definitions included in the LNM in a LNM data format associated with the LNM. For example, the ICD translator 460 can select an ICD object of interest such as the LRU ICD object 300, instantiate the LRU ICD object 300 in the LNM, and populate LNM definitions associated with the instantiated object in the LNM with the ICD application definitions 308, the ICD interface definitions 312, etc.

In the illustrated example of FIG. 4, the model manager 100 includes the LSM translator 470 to transform and/or otherwise convert data included in the LNM from the LNM data format to an LSM data format. For example, the LSM translator 470 can be an LNM-LSM translator. For example, the LSM translator 470 can select an IMA model object of interest such as the IMA application model object 314, instantiate the IMA application model object 314 in the modeling environment 304, and populate the IMA application definitions 318 with the corresponding LNM definitions included in the LNM, which correspond to the ICD application definitions 308 included in the ICD 114. For example, there is an LNM model object for each IMA model object. Each model object includes the same number and types of attributes and elements and, thus, the data between the LNM model objects and the IMA model objects can be synchronized. For example, the LNM definitions included in the LNM associated with the IMA application definitions 318 included the same number and types of attributes and elements.

In some examples, the LSM translator 470 converts (1) LNM definitions included in the LNM in the LNM data format specific to the LNM to (2) the IMA application definitions 318, the IMA interface definitions 320, etc., in a LSM data format specific to the modeling environment 304 of FIG. 3. In some examples, the LSM translator 470 generates a presentation layer. For example, the LSM translator 470 can generate a presentation layer to simulate a network layer responsible for tasks such as handling syntax processing of message data including format conversions, encryption/decryption, etc., to support an upper layer to the presentation layer. For example, the LSM translator 470 can generate a presentation layer 600 as described below in connection with FIG. 6.

In the illustrated example of FIG. 4, the model manager 100 includes the interface validator 480 to confirm and/or otherwise verify translated information conforms with definition rules (e.g., ICD definition rules, LNM definition rules, IMA definition rules, etc.). In some examples, the interface validator 480 validates ICD information. For example, the interface validator 480 can compare information to be stored in the ICD 114 to an ICD definition rule and store the information in the ICD 114 when the information is validated based on the comparison. In some examples, the interface validator 480 validates LNM information. For example, the interface validator 480 can compare information to be stored in the LNM to an LNM definition rule and store the information in the LNM when the information is validated based on the comparison.

In some examples, the interface validator 480 validates LSM information. For example, the interface validator 480 can compare information to be imported into the LSM (e.g., the modeling environment 304 of FIG. 3) to an IMA definition rule and import the information into the LSM when the information is validated based on the comparison. In some examples, the interface validator 480 generates an alert in response to not validating ICD, LNM, and/or LSM information. For example, the interface validator 480 can halt an operation of an IMA system model and generates an error message, an alert, etc. In some examples, the alert is transmitted to a user interface to notify a user that the ICD, LNM, and/or the LSM information need to be modified to comply with the definition rules. For example, a user can modify a definition associated with a model object to cause the model object to comply with a definition rule.

In some examples, the interface validator 480 executes an IMA system model. For example, the interface validator 480 can execute, run, operate, etc., the model 302 of FIG. 3 and generate one or more outputs. For example, the interface validator 480 can generate an output of an aircraft system component such as an effector, a sensor, a network switch, etc. For example, the interface validator 480 can execute the model 302 to simulate a status of the effector 232 of FIG. 2 such as the effector 232 being disabled, enabled, operating at a specified capacity or power percentage, etc. In another example, the interface validator 480 can execute the model 302 to simulate a measurement of the sensor 230 of FIG. 2 such as the sensor 230 measuring a pressure, a speed, a temperature, etc. In yet another example, the interface validator 480 can execute the model 302 to simulate a parameter of the NS 222 of FIG. 2 such as a bandwidth, a latency, a throughput, an IP address, a media access control (MAC) address, a communication protocol parameter, etc.

In some examples, the interface validator 480 validates an IMA system model based on an output of the IMA system model. For example, the interface validator 480 can validate the model 302 of FIG. 3 by comparing an output of the model 302 (e.g., a pressure measurement of the sensor 230, a latency of the NS 222, etc.) to a validation output and validate the model 302 based on the comparison. For example, the validation output can correspond to an expected value of the model 302. For example, the interface validator 480 can compare the output of the model 302 to a corresponding validation output and determine whether the output satisfies the validation output by substantially matching (e.g., matching or matching within a tolerance) the validation output. In some examples, the interface validator 480 can validate the model 302 of FIG. 3 by comparing one or more outputs to one or more corresponding validation outputs and determine that the one or more outputs satisfy the one or more corresponding validation outputs based on the comparison.

In the illustrated example of FIG. 4, the model manager 100 includes the report generator 490 to generate a report based on an action executed by the model manager 100. In some examples, the report generator 490 generates a report when the model manager 100 creates an IMA model. For example, the report generator 490 can generate a report when one or more of the IMA application model object 314, the IMA interface model object 316, the IMA application definitions 318, the IMA interface definitions 320, etc., and/or a combination thereof are validated (e.g., the LNM definitions imported from the LNM are validated based on a comparison to an LSM definition rule).

In some examples, the report generator 490 initiates an action by generating a report including the outputs 124 of FIG. 1. For example, the report generator 490 can generate a report indicating that the A664 LRU 224 of FIG. 2 modeled with the model 302 can be released for production. The report can include at least one of machine readable instructions, supply chain build instructions, manufacturing build instructions, etc. For example, the report generator 490 can determine that the model 302 successfully executed a verification and/or a validation test function associated with the A664 LRU 224, the aircraft system 106 of FIG. 1, etc. For example, the report generator 490 can initiate a production of the aircraft system 106 and/or, more generally, the aircraft 108 of FIG. 1 by generating a report and transmitting an alert, a notification, etc., including the report to another computing system such as a supply chain computing system or a manufacturing computing system configured to generate manufacturing orders, prototype manufacturing orders, etc., to produce the A664 LRU 224, the aircraft system 106, etc., when the corresponding model 302 has been executed and/or validated. For example, the report generator 490 can initiate production of the aircraft system 106 and/or, more generally, the aircraft 108 based on at least one of the manufacturing build instructions, the supply chain build instructions, the machine readable instructions, etc.

While an example manner of implementing the model manager 100 of FIGS. 1 and 3 is illustrated in FIG. 4, one or more of the elements, processes, and/or devices illustrated in FIG. 4 can be combined, divided, re-arranged, omitted, eliminated, and/or implemented in any other way. Further, the modeling environment selector 410, the data source selector 420, the interface importer 430, the interface exporter 440, the model object handler 450, the LNM translator 460, the LSM translator 470, the interface validator 480, the report generator 490, and/or, more generally, the model manager 100 of FIGS. 1 and 3 can be implemented by hardware, software, firmware, and/or any combination of hardware, software, and/or firmware. Thus, for example, any of the modeling environment selector 410, the data source selector 420, the interface importer 430, the interface exporter 440, the model object handler 450, the LNM translator 460, the LSM translator 470, the interface validator 480, the report generator 490, and/or, more generally, the model manager 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the modeling environment selector 410, the data source selector 420, the interface importer 430, the interface exporter 440, the model object handler 450, the LNM translator 460, the LSM translator 470, the interface validator 480, and/or the report generator 490 is/are hereby expressly defined to include a non-transitory computer readable storage device or storage disk such as a memory, a digital versatile disk (DVD), a compact disk (CD), a Blu-ray disk, etc., including the software and/or firmware. Further still, the model manager 100 of FIGS. 1 and 3 can include one or more elements, processes, and/or devices in addition to, or instead of, those illustrated in FIG. 4, and/or can include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
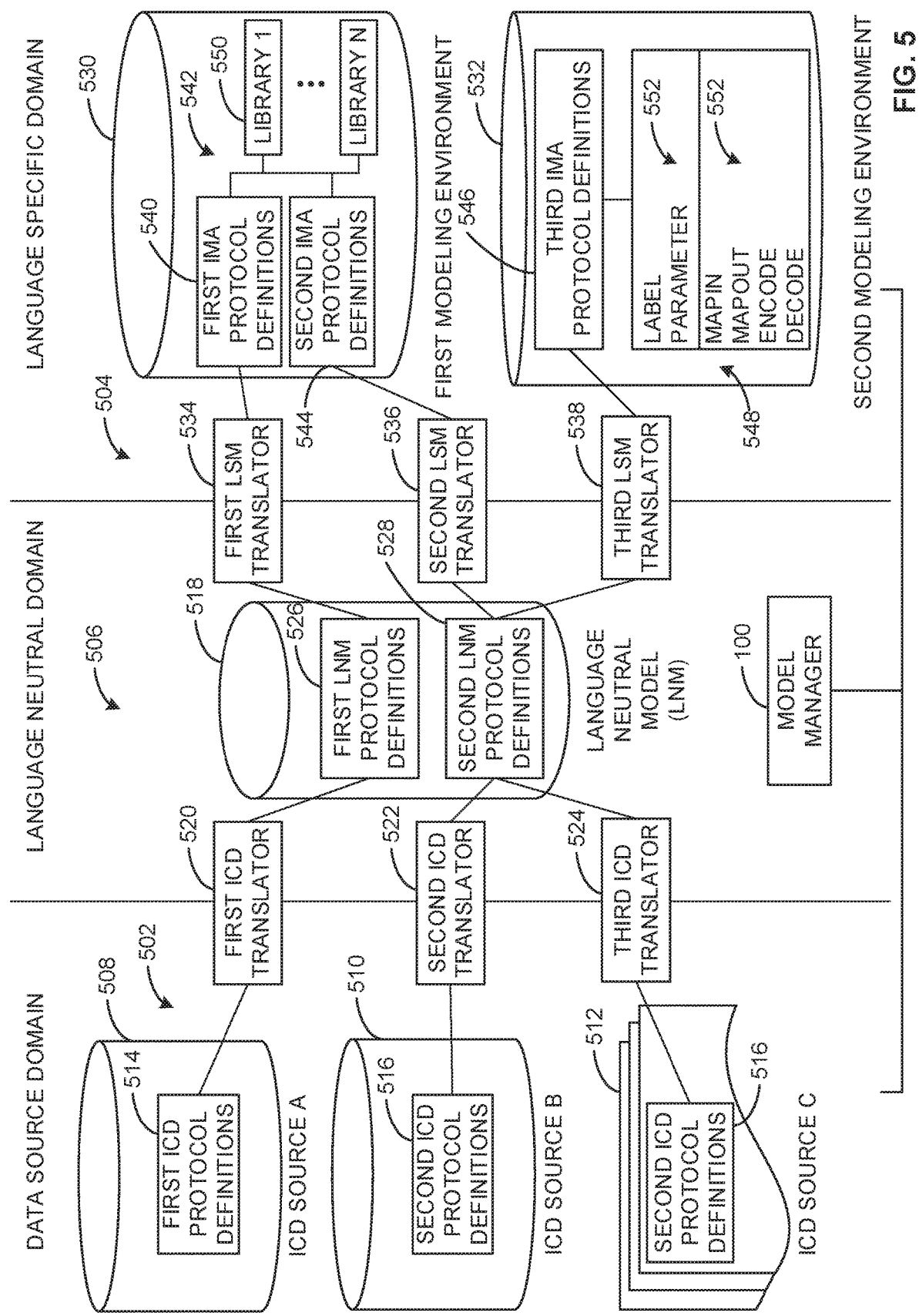
FIG. 5 is a schematic illustration of importing example information from an example data source domain to an example language specific domain via an example language neutral domain.

FIG. 5 is a schematic illustration of importing information from an example data source domain 502 to an example language specific domain 504 via an example language neutral domain 506. In FIG. 5, the data source domain 502 includes example ICD sources such as a first example ICD source 508, a second example ICD source 510, and a third example ICD source 512. The first ICD source 508 and the second ICD source 510 are databases. The third ICD source 512 represents a set of one or more documents (e.g., spreadsheets, requirements documents, specification documents, etc.).

In FIG. 5, the first ICD source 508 includes first ICD protocol definitions 514. For example, the first ICD protocol definitions 514 can be ICD definitions (e.g., the ICD application definitions 308, the ICD interface definitions 312, etc., of FIG. 3) associated with a first communication protocol. For example, the first communication protocol can be A429 communication protocol. For example, the first ICD protocol definitions 514 can include ICD definitions corresponding to one or more A429 communication ports and/or control logic to implement the A429 communication ports. For example, the first ICD protocol definitions 514 can correspond to queueing and/or sampling ports associated with the A429 end system 236 and/or, more generally, the A429 LRU 234 of FIG. 2.

In some examples, ICD protocol definitions such as the first ICD protocol definitions 514 can be interface information, requirement information, specification information, etc., associated with the aircraft system 106 of FIG. 1. For example, the first ICD protocol definitions 514 can be interface information associated with the NS 222 of FIG. 2 including communication port information (e.g., an IP address, a media access control (MAC) address, a communication protocol address, etc.), connector pinout information, wiring information, etc. In another example, the first ICD protocol definitions 514 can be requirement information such as a quantity and/or a type of components included in the aircraft system 106 such as a quantity of network switches in the aircraft network 200 of FIG. 2, a type of the effector 232 and/or the sensor 230, a number of partitions used by the GPM 204 of FIG. 2, etc. In yet another example, the first ICD protocol definitions 514 can be performance information of an aircraft system component (e.g., a bandwidth, a data throughput, a latency, etc., of the NS 222), firmware version information of the aircraft system component, software version information of the aircraft system component, etc.

In FIG. 5, the second ICD source 510 includes second ICD protocol definitions 516. For example, the second ICD protocol definitions 516 can be ICD definitions associated with a second communication protocol. For example, the second communication protocol can be A664 communication protocol. For example, the second ICD protocol definitions 516 can include ICD definitions corresponding to one or more A664 communication ports and/or control logic to implement the A664 communication ports. For example, the second ICD protocol definitions 516 can correspond to queuing and/or sampling ports associated with the first A664 end system 214 and/or, more generally, the GPM 204 of FIG. 2. In FIG. 5, the third ICD source 512 includes documents that include information associated with the second ICD protocol definitions 516. For example, the third ICD source 512 can include documents that include ICD definitions corresponding to one or more A664 communication ports and/or control logic to implement the A664 communication ports.

The first ICD source 508, the second ICD source 510, and/or the third ICD source 512 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The first ICD source 508, the second ICD source 510, and/or the third ICD source 512 can additionally or alternatively be implemented by one or more double data rate (DDR) memories, such as DDR, DDR2, DDR3, DDR4, mobile DDR (mDDR), etc. The first ICD source 508, the second ICD source 510, and/or the third ICD source 512 can additionally or alternatively be implemented by one or more mass storage devices such as hard disk drive(s), compact disk drive(s) digital versatile disk drive(s), solid-state drives, etc. While in the illustrated example the first ICD source 508, the second ICD source 510, and the third ICD source 512 are illustrated as a single database or a single set of documents, the first ICD source 508, the second ICD source 510, and the third ICD source 512 can be implemented by any number and/or type(s) of databases or sets of documents.

In the illustrated example of FIG. 5, the model manager 100 converts data between the data source domain 502 and a language neutral model (LNM) 518 included in the language neutral domain 506 via a first ICD translator 520, a second ICD translator 522, and a third ICD translator 524. For example, the ICD translator 460 of FIG. 4 can implement the first through third ICD translators 520, 522, 524. For example, the ICD translator 460 of FIG. 4 can implement the first ICD translator 520 to convert (1) the first ICD protocol definitions 514 included in the first ICD source 508 in an ICD data format specified by the first ICD source 508 to (2) first LNM protocol definitions 526 included in the LNM 518 in a LNM data format specified by the LNM 518. In some examples, the interface importer 430 instructs the ICD translator 460 to implement the first through third ICD translators 520, 522, 524.

In another example, the ICD translator 460 can implement the second ICD translator 522 to convert (1) the second ICD protocol definitions 516 included in the second ICD source 510 in a ICD data format specified by the second ICD source 510 to (2) second LNM protocol definitions 528 included in the LNM 518 in the LNM data format specified by the LNM 518. In yet another example, the ICD translator 460 can implement the third ICD translator 524 to convert (1) the second ICD protocol definitions 516 included in the third ICD source 512 in an ICD data format specified by the third ICD source 512 to (2) the second LNM protocol definitions 528 included in the LNM 518 in the LNM data format specified by the LNM 518.

In FIG. 5, the first LNM protocol definitions 526 are language neutral definitions that are associated with the first ICD protocol definitions 514. As used herein, the term "language neutral definition" refers to data structures of control logic functions and associated configuration parameters corresponding to a function of an aircraft component, an aircraft sub-system, an aircraft system, etc., independent of the data source domain 502 and the language specific domain 504. For example, a language neutral definition can include the same value of an attribute or an element as an ICD definition and/or a language specific definition but in a data format or a data structure not used by either the ICD definition or the language specific definition. Therefore, an ICD source included in the data source domain 502 or a modeling environment included in the language specific domain 504 can be added, removed, or modified without affecting the language neutral definitions (e.g., the first LNM protocol definitions 526, the second LNM protocol definitions 528, etc.) included in the LNM 518.

In FIG. 5, a format of data included in the first LNM protocol definitions 526 and the second LNM protocol definitions 528 is independent of a selection of one of the first ICD source 508, the second ICD source 510, or the third ICD source 512 to process. For example, the information included in the first LNM protocol definitions 526 retains the same data format independent of a selected definition or a selection of one of the first ICD source 508, the second ICD source 510, or the third ICD source 512. As a result, the LNM 518 is unaffected when the model manager 100 modifies one or more of the first ICD source 508, the second ICD source 510, or the third ICD source 512 as the LNM 518 interacts with the first ICD source 508, the second ICD source 510, or the third ICD source 512 via one of the first through third ICD translators 520, 522, 524.

In FIG. 5, the first LNM protocol definitions 526 can include the same number and types of attributes and elements as the first ICD protocol definitions 514. The information included in the first LNM protocol definitions 526 are associated with the same communication protocol as the first ICD protocol definitions 514. For example, the first LNM protocol definitions 526 can correspond to A429 communication protocol. For example, the first LNM protocol definitions 526 can include language neutral definitions corresponding to one or more A429 communication ports and/or control logic to implement the A429 communication ports. For example, the first LNM protocol definitions 526 can correspond to queueing and/or sampling ports associated with the A429 end system 236 and/or, more generally, the A429 LRU 234 of FIG. 2.

In FIG. 5, the second LNM protocol definitions 528 can include the same number and types of attributes and elements as the second ICD protocol definitions 516. The information included in the second LNM protocol definitions 528 are associated with the same communication protocol as the second ICD protocol definitions 516. For example, the second LNM protocol definitions 528 can correspond to A664 communication protocol. For example, the second LNM protocol definitions 528 can include language neutral definitions corresponding to one or more A664 communication ports and/or control logic to implement the A664 communication ports. For example, the second LNM protocol definitions 528 can correspond to queueing and/or sampling ports associated with the first A664 end system 214 and/or, more generally, the GPM 204 of FIG. 2.

In the illustrated example of FIG. 5, the language specific domain 504 includes a first modeling environment 530 and a second modeling environment 532. Alternatively, there can be fewer or more than the first and second modeling environments 530, 532 depicted in FIG. 5. In the illustrated example of FIG. 5, the model manager 100 converts data between the language neutral domain 506 and the language specific domain 504 via a first language specific model (LSM) translator 534, a second LSM translator 536, and a third LSM translator 538. For example, the LSM translator 470 of FIG. 4 can implement the first through third LSM translators 534, 536, 538. For example, the LSM translator 470 of FIG. 4 can implement the first LSM translator 534 to convert (1) the first LNM protocol definitions 526 included in the LNM 518 in the LNM data format specified by the LNM 518 to (2) first IMA protocol definitions 540 included in the first modeling environment 530 in a first LSM data format 542 specified by the first modeling environment 530. In some examples, the interface importer 430 instructs the LSM translator 470 to implement the first through third LSM translators 534, 536, 538.

In another example, the LSM translator 470 of FIG. 4 can implement the second LSM translator 536 to convert (1) the second LNM protocol definitions 528 included in the LNM 518 in the LNM data format specified by the LNM 518 to (2) second IMA protocol definitions 544 included in the first modeling environment 530 in the first LSM data format 542 specified by the first modeling environment 530. In FIG. 5, the first IMA protocol definitions 540, the second IMA protocol definitions 544, etc., can correspond to the IMA application definitions 318 and/or the IMA interface definitions 320 of FIG. 3.

In yet another example, the LSM translator 470 of FIG. 4 can implement the third LSM translator 538 to convert (1) the second LNM protocol definitions 528 included in the LNM 518 in the LNM data format specified by the LNM 518 to (2) third IMA protocol definitions 546 included in the second modeling environment 532 in a second LSM data format 548 specified by the second modeling environment 532.

In FIG. 5, the first modeling environment 530 is based on the first LSM data format 542. The first LSM data format 542 of FIG. 5 is defined by libraries 550 (e.g., model libraries, model object libraries, etc.) based on a selection of one of an ICD protocol definition (e.g., the first ICD protocol definitions 514, the second ICD protocol definitions 516, etc.) and/or a selection of an ICD source (e.g., the first ICD source 508, the second ICD source 510, etc.). For example, the model manager 100 can select the first ICD source 508 to generate an IMA model in the first modeling environment 530. In response to selecting the first ICD source 508, the model manager 100 can translate the first ICD protocol definitions 514 to the first LNM protocol definitions 526 via the first ICD translator 520. In response to generating the first LNM protocol definitions 526, the model manager 100 can translate the first LNM protocol definitions 526 to the first IMA protocol definitions 540 via the first LSM translator 534. The model manager 100 can generate the libraries 550 based on the first IMA protocol definitions 540.

In FIG. 5, the second modeling environment 532 is based on the second LSM data format 548. The second LSM data format 548 of FIG. 5 is defined by block definitions 552 (e.g., model block definitions, model block object definitions, etc.) based on a selection of one of an ICD protocol definition (e.g., the first ICD protocol definitions 514, the second ICD protocol definitions 516, etc.) and/or a selection of an ICD source (e.g., the first ICD source 508, the second ICD source 510, etc.). For example, the model manager 100 can select the second ICD source 510 to generate an IMA model in the second modeling environment 532. In response to selecting the second ICD source 510, the model manager 100 can translate the second ICD protocol definitions 516 to the second LNM protocol definitions 528 via the second ICD translator 522. In response to generating the second LNM protocol definitions 528, the model manager 100 can translate the second LNM protocol definitions 528 to the third IMA protocol definitions 546 via the third LSM translator 538. The model manager 100 can generate the block definitions 552 based on the third IMA protocol definitions 546.

In FIG. 5, a format of data included in the first LNM protocol definitions 526 and the second LNM protocol definitions 528 is independent of a selection of either the first modeling environment 530 or the second modeling environment 532. For example, the information included in the second LNM protocol definitions 528 retains the same data format independent of a selection of either the first modeling environment 530 or the second modeling environment 532. As a result, the LNM 518 is unaffected when the model manager 100 modifies one or more of the libraries 550 or one or more of the block definitions 552 as the LNM 518 interacts with the first modeling environment 530 and the second modeling environment 532 via one of the first through third LSM translators 534, 536, 538. For example, the model manager 100 can import the second LNM protocol definitions 528 into either the first modeling environment 530 or the second modeling environment 532 without modifying the second LNM protocol definitions 528.

In some examples, the model manager 100 generates LNM definitions (e.g., the first and second LNM protocol definitions 526, 528) using one or more transformational rules. A transformational rule can represent a data structure (e.g., a transformational data structure) including one or more data components to which an LNM definition must comply and/or otherwise satisfy to be stored in the LNM 518. For example, the model manager 100 can translate the first IMA protocol definitions 540 to the first LNM protocol definitions 526 via the first LSM translator 534. In such an example, the first LSM translator 534 can compare a data structure of one of the first IMA protocol definitions 540 to a transformation rule that includes a transformational data structure. In response to the data structure not matching the transformational data structure, the first LSM translator 534 can aggregate missing data components of the data structure with the existing data components of the data structure and compile the aggregated components into an LNM definition. The first LSM translator 534 can export the LNM definition to the LNM 518 to become part of the first LNM protocol definitions 526 and/or the second LNM protocol definitions 528.

Figure 6:
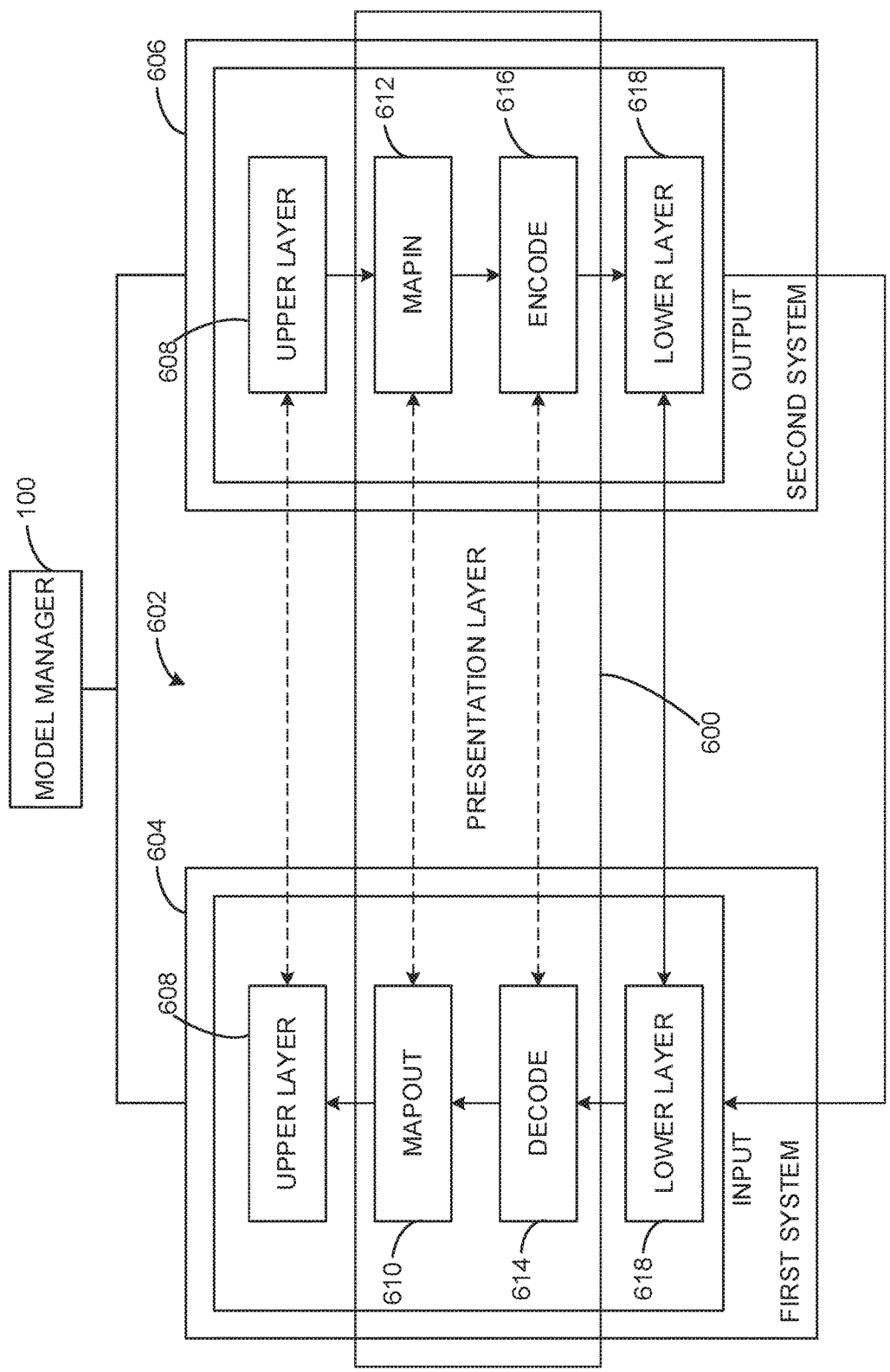
FIG. 6 is an example implementation of an example presentation layer of an example modeling system.

FIG. 6 is an example implementation of an example presentation layer 600 of an example modeling system 602. For example, the modeling system 602 can be an IMA modeling system. The modeling system 602 of FIG. 6 represents a modeling system of a first system 604 and a second system 606 based on the Open Systems Interconnection (OSI) model, which is a networking framework to implement communication protocols in layers, with control passed from one layer to the next. In FIG. 6, upper layers 608 (e.g., application layers) simulate a network layer that supplies network services to end-user applications including protocols that focus on process-to-process communication across a network. For example, the upper layers 608 can represent an abstraction of an Ethernet-based protocol (e.g., HTTP packets), a CAN bus protocol (e.g., CAN bus packets), A429 protocol, etc.

In FIG. 6, the upper layers 608 exchange data with one another using services provided by the presentation layer 600. The presentation layer 600 simulates a network layer responsible for tasks such as handling syntax processing of message data including format conversions, encryption/decryption, etc., to support the upper layers 608 above the presentation layer 600. The presentation layer 600 of FIG. 6 includes an example MAPOUT abstraction 610 and a corresponding example MAPIN abstraction 612. The MAPOUT abstraction 610 and the MAPIN abstraction 612 are abstractions of parametric data protocol communication blocks that can be included in a model in a modeling environment. For example, the MAPOUT abstraction 610 can be a presentation model block capable of being inserted into a model in a modeling environment to enable the model manager 100 to select a presentation style of element names (e.g., Parameter Field Name, Defined Mnemonic Name, Defined Parameter Name, etc.). In such an example, the MAPIN abstraction 612 can obtain the element names from the MAPOUT abstraction 610, which can be presented to the model manager 100, a user of the modeling environment (e.g., a design engineer), etc.

The presentation layer 600 of FIG. 6 includes an example DECODE abstraction 614 and a corresponding example ENCODE abstraction 616. In some examples, the DECODE abstraction 614 and the ENCODE abstraction 616 manipulate data encoded in binary frame buffers to bus object elements. For example, the DECODE abstraction 614 and the ENCODE abstraction 616 can be presentation model blocks capable of being inserted into a model in a modeling environment to enable encoding/decoding of data. For example, the ENCODE abstraction 616 can encode data (e.g., a sensor value) by converting an analog voltage value to a binary value. In such an example, the DECODE abstraction 614 can decode the data by converting the binary value to the analog voltage value.

In the illustrated example of FIG. 6, the modeling system 602 includes lower layers 618 to simulate a transmission of digital data bits using a type of signaling supported by a physical medium. For example, the lower layer 618 can include one or more of a session layer, a transport layer, a network layer, a data link layer, or a physical layer. For example, the lower layers 618 can be simulations of data transmitted by electrical signals, electromagnetic signals, pulses of infrared or ordinary light, etc. For example, the lower layers 618 can be simulations of data being transmitted and/or received by Ethernet cables, radio antennae, fiber-optic cables, etc.

Figure 7A:
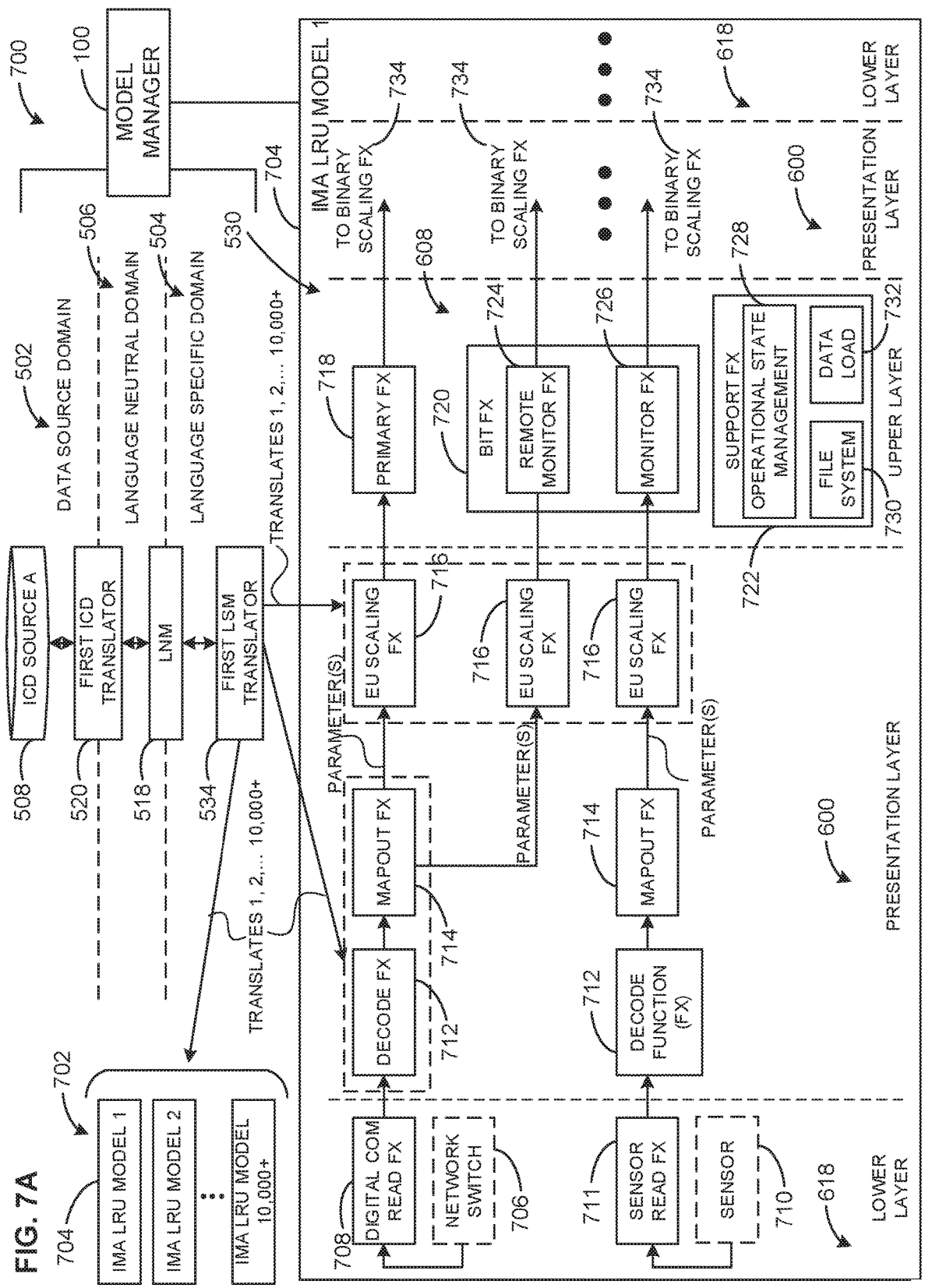
FIG. 7A depicts an example IMA model generation system to generate, execute, and validate a plurality of IMA LRU models associated with the aircraft of FIG. 1.

FIG. 7A depicts an IMA model generation system 700 to generate, execute, and validate a plurality of IMA models 702 associated with the aircraft 108 of FIG. 1. In FIG. 7A, the IMA models 702 are IMA LRU models 702. Alternatively, the IMA models 702 can be IMA GPM models, IMA ASM models, IMA network switch models, IMA RDC models, etc., and/or a combination thereof. In FIG. 7A, the plurality of IMA LRU models 702 include more than 10,000 IMA models. Alternatively, the IMA model generation system 700 can generate fewer than 10,000 IMA models. In FIG. 7A, the plurality of IMA LRU models 702 includes a first IMA model 704. In FIG. 7A, the first IMA model 704 is a first IMA LRU model (IMA LRU MODEL 1) 704. For example, the first IMA LRU model 704 can correspond to an IMA model of the A429 LRU 234, the A664 LRU 224, etc., of FIG. 2. For example, the first IMA LRU model 704 can simulate the A429 LRU 234, the A664 LRU, etc. In another example, one or more of the plurality of the IMA LRU models 702 can correspond to the aircraft system 106 and/or, more generally, the aircraft 108 of FIG. 1.

In FIG. 7A, the model manager 100 manages the IMA model generation system 700. In FIG. 7A, the model manager 100 converts information from the first ICD source 508 such as the first ICD protocol definitions 514 to the LNM 518 via the first ICD translator 520. In FIG. 7A, the model manager 100 converts information from the LNM 518 to the first IMA LRU model 704 in the first modeling environment 530 via the first LSM translator 534. For example, the first LSM translator 534 can translate the information from the LNM 518 to more than 10,000 IMA LRU models as depicted in FIG. 7A.

In the illustrated example of FIG. 7A, the model manager 100 generates, executes, and validates the plurality of IMA LRU models 702 including the first IMA LRU model 704. In FIG. 7A, the first IMA LRU model 704 includes the lower layer 618, the presentation layer 600, and the upper layer 608 of FIG. 6. In FIG. 7A, the lower layer 618 simulates obtaining data from physical components. In FIG. 7A, the lower layer 618 simulates obtaining network data from an example network switch 706. For example, the network switch 706 can correspond to the CCR NS 218, the NS 222, etc., of FIG. 2. In FIG. 7A, the lower layer 618 obtains network data (e.g., communication protocol data packets) from the network switch 706 via a digital communication (COM) read function (FX) 708. In FIG. 7A, the digital COM read function 708 is implemented by the first modeling environment 530 using machine readable instructions to simulate obtaining network data from the network switch 706 and converting the obtained network data into a digital data format such as a binary data format.

In some examples, the network switch 706 is simulated. For example, the digital COM read function 708 can obtain previously recorded network data associated with the network switch 706. For example, the digital COM read function 708 can read previously recorded and/or simulated communication protocol data packets from a database. In some examples, the network switch 706 is not simulated. For example, the digital COM read function 708 can obtain network data from a physical device such as the CCR NS 218 of FIG. 2 in real-time.

In FIG. 7A, the lower layer 618 simulates obtaining sensor data from an example sensor 710. For example, the sensor 710 can correspond to the sensor 230 of FIG. 2. In FIG. 7A, the lower layer 618 obtains sensor data (e.g., analog signals, digital signals, etc.) from the sensor 710 via a sensor read function 711. In FIG. 7A, the sensor read function 711 is implemented by the first modeling environment 530 using machine readable instructions to simulate obtaining sensor data from the sensor 710 and converting the obtained sensor data into a digital format such as a binary data format.

In some examples, the sensor 710 is simulated. For example, the sensor read function 711 can obtain previously recorded sensor data associated with the sensor 710. For example, the sensor read function 711 can read previously recorded and/or simulated analog signals, digital signals, etc., from a database. In some examples, the sensor 710 is not simulated. For example, the sensor read function 711 can obtain sensor data from a physical device such as the sensor 230 of FIG. 2 in real-time.

In FIG. 7A, the first IMA LRU model 704 includes the presentation layer 600 to facilitate a simulation of converting binary data obtained from the lower layer 618 to data in engineering units to be used by the upper layer 608. In FIG. 7A, the first IMA LRU model 704 decodes or unpacks data via an example DECODE function 712. For example, the DECODE function 712 can correspond to the DECODE abstraction 614 of FIG. 6. The DECODE function 712 can unpack network data obtained by the digital COM read function 708 to parse included information such as a network address, a network parameter, payload data, etc.

In FIG. 7A, the first IMA LRU model 704 maps the unpacked network data to IMA protocol definitions such as the first IMA protocol definitions 540 of FIG. 5 via an example MAPOUT function 714. For example, the MAPOUT function 714 can correspond to the MAPOUT abstraction 610 of FIG. 6. The MAPOUT function 714 can associate or point information included in the unpacked network data to the appropriate data fields included in the first IMA protocol definitions 540. For example, the MAPOUT function 714 can generate one or more parameters representing an attribute with an associated value. For example, the parameter can be a value of a network address, a value of a network parameter, a value associated with payload data, etc.

In FIG. 7A, the first IMA LRU model 704 converts and/or otherwise scales binary data to data in engineering units via engineering unit (EU) scaling functions 716. For example, the EU scaling functions 716 can convert binary data associated with an analog signal value (e.g., a voltage signal, a current signal, etc.) from the sensor 710 to engineering units associated with ranges of physical parameters such as pressure (e.g., 0-1000 pounds per square inch (PSI)), speed (e.g., 0-5000 revolutions per minute (RPM)), a position percentage (e.g., 25% open, 75% closed, etc.), a flow (e.g., 0-25 gallons per minute), etc.

In FIG. 7A, the first IMA LRU model 704 executes control logic using the engineering unit data from the EU scaling functions 716 via primary function 718, a Built-In Test (BIT) function 720, and support function 722 associated with the upper layer 608. In FIG. 7A, the primary function 718 can include on or more control logic routines. For example, the primary function 718 can include executing a flap actuation command, a slat actuation command, etc., of the aircraft 108 based on obtained data from the network switch 706. For example, the primary function 718 can include actuating physical components of the aircraft system 106 and/or, more generally, the aircraft 108, such as a motor, a pump, a solenoid, a valve, etc.

In FIG. 7A, the BIT function 720 can correspond to executing functions associated with the RDC 226 of FIG. 2. For example, the BIT function 720 can simulate obtaining network data from the A429 LRU 234 of FIG. 2, sensor data from the sensor 230 of FIG. 2, generating and/or transmitting control signals to the effector 232 of FIG. 2, etc. In FIG. 7A, the BIT function 720 includes a remote monitor function 724 and a monitor function 726. In FIG. 7A, the remote monitor function 724 simulates obtaining network data from the network switch 706 and transmitting the network data to a network such as the CAN bus 238 of FIG. 2. In FIG. 7A, the monitor function 726 simulates obtaining sensor data from the sensor 710 and transmitting the sensor data to a network such as the CAN bus 238 of FIG. 2, the NS 222 of FIG. 2, etc.

In FIG. 7A, the first IMA LRU model 704 includes the support function 722 to simulate ancillary control logic functions using the engineering unit data from the EU scaling functions 716. In FIG. 7A, the support function 722 includes operational state management 728, file system 730, and data load 732. In FIG. 7A, the operational state management 728 corresponds to a simulation of status information for physical components associated with the first IMA LRU model 704 such as the network switch 706, the sensor 710, etc., based on obtained network data and/or sensor data. In FIG. 7A, the file system 730 corresponds to a simulation of an operating system of the simulated LRU such as the A429 LRU 234, the A664 LRU 224, etc., of FIG. 2. In FIG. 7A, the data load 732 corresponds to a simulation of status information such as processor utilization, storage utilization, memory utilization, etc., of the simulated LRU.

In FIG. 7A, the first LSM translator 534 translates one or more DECODE functions 712, MAPOUT functions 714, and/or EU scaling functions 716. For example, the first LSM translator 534 can translate more than 10,000 instances of the DECODE function 712 with each instance including parameters associated with the first IMA protocol definitions 540. For example, the first LSM translator 534 can translate a first instance of the DECODE function 712 with a first set of parameters based on the first IMA protocol definitions 540 corresponding to a first function of the simulated LRU. In such an example, the first LSM translator 534 can translate a second instance of the DECODE function 712 with a second set of parameters based on the first IMA protocol definitions 540 corresponding to a second function of the simulated LRU, where the first set of parameters are different from the second set of parameters. In such an example, the model manager 100 can generate a plurality of simulated functions of the simulated LRU based on the first IMA protocol definitions 540.

Figure 7B:
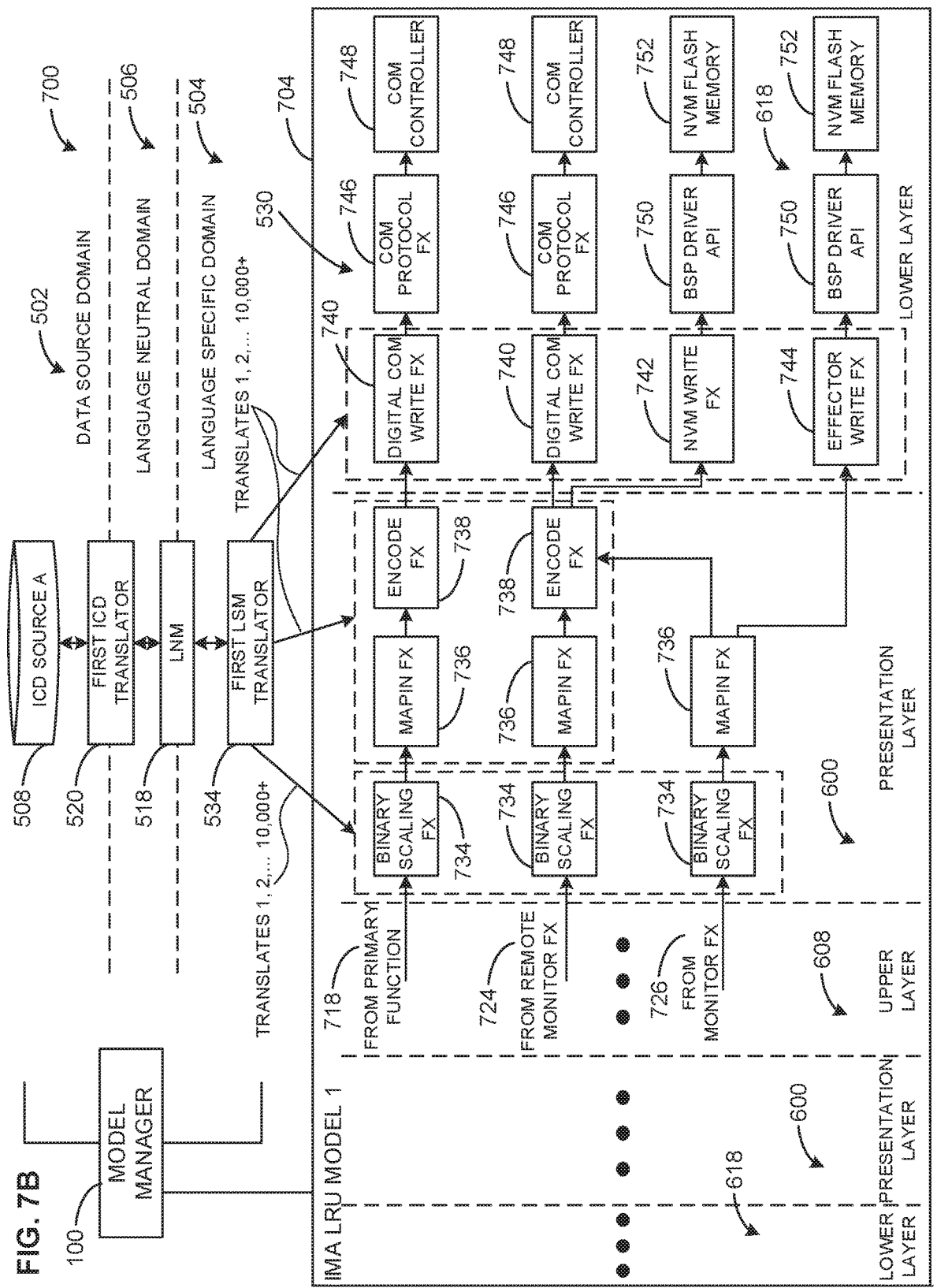
FIG. 7B depicts a continuation of the IMA model generation system of FIG. 7A.

FIG. 7B depicts a continuation of the IMA model generation system 700 of FIG. 7A. In FIG. 7B, the first IMA LRU model 704 includes example binary scaling functions 734 to convert engineering unit data to binary data. In FIG. 7B, the first IMA LRU model 704 maps the converted binary data to IMA protocol definitions such as the first IMA protocol definitions 540 of FIG. 5 via an example MAPIN function 736. For example, the MAPIN function 736 can correspond to the MAPIN abstraction 612 of FIG. 6. The MAPIN function 736 can associate or point information included in the converted binary to the appropriate data fields included in the first IMA protocol definitions 540. For example, the MAPIN function 736 can associate the converted binary data to the IMA application definitions 318, the IMA interface definitions 320, etc., of FIG. 3.

In FIG. 7B, the first IMA LRU model 704 encodes or encapsulates binary data into communication protocol data packets via an example ENCODE function 738. For example, the ENCODE function 738 can correspond to the ENCODE abstraction 616 of FIG. 6. The ENCODE function 738 can convert binary data processed by the upper layer 608 into digital data.

In FIG. 7B, the first IMA LRU model 704 includes the lower layer 618 to transmit and/or store the digital data via a digital COM write function 740, a non-volatile memory write function 742, and/or an effector write function 744. In FIG. 7B, the digital COM write function 740 is implemented by the first modeling environment 530 using machine readable instructions to simulate opening a network data session in which the digital data can be written to a communication transmission buffer in which the digital data can be encapsulated and transmitted in a first-in-first-out (FIFO) order to a network. In FIG. 7B, the non-volatile memory write function 742 writes the digital data to a non-volatile memory. In FIG. 7B, the effector write function 744 is implemented by the first modeling environment 530 using machine readable instructions to simulate writing the digital data to an effector buffer in which the digital data can be converted to a control signal to control an effector such as the effector 232 of FIG. 2.

In FIG. 7B, the first IMA LRU model 704 includes an example COM protocol function 746 to encapsulate digital data into a communication protocol data format (e.g., A429 communication protocol data format, A664 communication protocol data format, etc.) to be transmitted to a network via an example COM controller 748. For example, the COM protocol function 746 can encapsulate the digital data into an A429 data packet and the COM controller 748 can transmit the A429 data packet via A429 communication protocol.

In FIG. 7B, the NVM write function 742 transmits the digital data to an example Board Support Package (BSP) driver application programming interface (API) 750. For example, the BSP driver API 750 can implement one or more drivers or middleware to facilitate machine readable instructions to hardware outputs. In response to the BSP driver API 750 processing the digital data, the first IMA LRU model 704 stores the processed digital data into NVM flash memory 752. In FIG. 7B, the effector write function 744 transmits the digital data to the BSP driver API 750 to convert the digital data into a control signal to control an effector such as the effector 232 of FIG. 2. In response to generating the control signal, the first IMA LRU model 704 stores the generated control signal in the NVM flash memory 752.

In FIG. 7B, the first LSM translator 534 translates one or more binary scaling functions 734, MAPIN functions 736, ENCODE functions 738, digital COM write functions 740, NVM write functions 742, and/or effector write functions 744. For example, the first LSM translator 534 can translate more than 10,000 instances of the ENCODE function 738 with each instance including parameters associated with the first IMA protocol definitions 540. For example, the first LSM translator 534 can translate a first instance of the ENCODE function 738 with a first set of parameters based on the first IMA protocol definitions 540 corresponding to a first function of the simulated LRU. In such an example, the first LSM translator 534 can translate a second instance of the ENCODE function 738 with a second set of parameters based on the first IMA protocol definitions 540 corresponding to a second function of the simulated LRU, where the first set of parameters are different from the second set of parameters. In such an example, the model manager 100 can generate a plurality of simulated functions of the simulated LRU based on the first IMA protocol definitions 540.

Figure 7C:
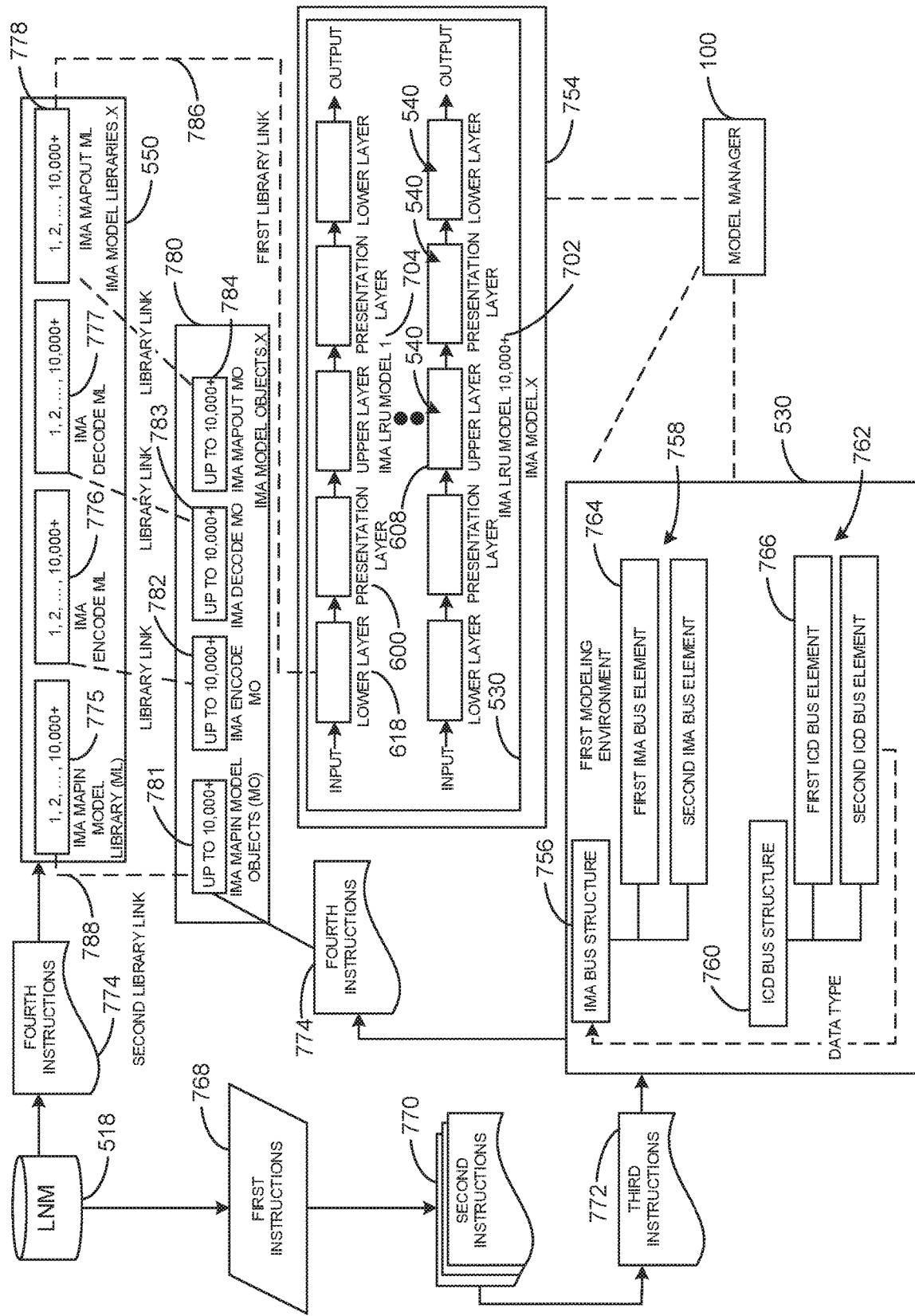
FIG. 7C depicts the model manager apparatus of FIG. 4 generating libraries associated with an example modeling environment.

FIG. 7C depicts the model manager 100 generating the libraries 550 associated with the first modeling environment 530 of FIG. 5. In the illustrated example of FIG. 7C, the model manager 100 selects and/or otherwise determines a modeling environment to be deployed. In FIG. 7C, the model manager 100 selects the first modeling environment 530 of FIG. 5 in which to generate an example IMA system model 754. For example, the IMA system model 754 can include the plurality of IMA LRU models 702 including the first IMA LRU model 704 of FIGS. 7A and 7B.

In the illustrated example of FIG. 7, the first modeling environment 530 includes an example IMA bus structure 756, which includes IMA bus elements 758. The IMA bus structure 756 is a bus object that specifies architectural properties of a simulated communication bus, which is distinct from the values of the signals that the simulated communication bus facilitates. For example, the IMA bus structure 756 can specify a quantity of elements in a bus, an order of the elements, whether and how the elements are nested, data types of corresponding signals, etc. For example, the model manager 100 can create the IMA bus structure 756 to simulate an organization, a syntax, or a structure of an aircraft communication protocol such as ARINC 429, ARINC 664, etc. For example, the IMA bus structure 756 can correspond to a structure of ARINC 664 where the IMA bus elements 758 correspond to definitions or properties of an ARINC664 bus signal (e.g., a value of an ARINC 664 bus signal, a unit of measure, etc.).

In FIG. 7C, the first modeling environment 530 includes an ICD bus structure 760, which includes example ICD bus elements 762. The ICD bus structure 760 is a bus object that specifies architectural properties of a simulated communication bus based on properties stored in the data source domain 502 such as the first ICD source 508 of FIG. 5. In FIG. 7C, the ICD bus structure 760 includes the ICD bus elements 762 to map information included in the data source domain 502 to information included in the first modeling environment 530. For example, the model manager 100 can populate data included in the IMA bus elements 758 using data included in the ICD bus elements 762. For example, the model manager 100 can populate a first IMA bus element 764 included in the IMA bus elements 758 using data included in a first ICD bus element 766 included in the ICD bus elements 762.

In operation, the model manager 100 generates the IMA system model 754 by importing information included in the LNM 518. In FIG. 7C, the model manager 100 determines that the first modeling environment 530 is to be used to generate the IMA system model 754. For example, the model manager 100 can select a data source such as the first ICD source 508 of FIG. 5 to retrieve information to be used to generate the IMA system model 754. The model manager 100 executes first instructions 768 to convert and/or otherwise translate (1) the first LNM protocol definitions 526, which is based on the first ICD protocol definitions 514 retrieved from the first ICD source 508, to (2) the first IMA protocol definitions 540.

In FIG. 7C, the model manager 100 executes second instructions 770 to generate the IMA bus structure 756 and the ICD bus structure 760. For example, the model manager 100 can direct the first modeling environment 530 to execute the second instructions 770 within the first modeling environment 530. In response to generating the IMA bus structure 756 and the ICD bus structure 760, the model manager 100 executes third instructions 772 to initialize or start the first modeling environment 530. For example, the model manager 100 can direct the first modeling environment 530 to execute the third instructions 772 within the first modeling environment 530.

In the illustrated example of FIG. 7C, in response to initializing the first modeling environment 530, the model manager 100 executes fourth instructions 774 to generate the libraries 550 of FIG. 5 based on the first LNM protocol definitions 526 included in the LNM 518. In FIG. 7C, the libraries 550 include an example IMA MAPIN model library (ML) 775, an example IMA ENCODE model library 776, an example IMA DECODE model library 777, and an example IMA MAPOUT model library 778. Each of the libraries 550 can include a plurality of IMA models, IMA model objects, IMA definitions, etc.

In FIG. 7C, the fourth instructions 774 translate the first LNM protocol definitions 526 to the first IMA protocol definitions 540. For example, the model manager 100 can direct the first modeling environment 530 to import IMA models, IMA model objects (e.g., the IMA application model object 314, the IMA interface model object 316, etc.), IMA definitions (e.g., the IMA application definitions 318, the IMA interface definitions 320, etc.), etc., included in the model libraries 550 into the first modeling environment 530 when applicable.

In FIG. 7C, the fourth instructions 774 generate IMA model objects 780 including example IMA MAPIN model objects 781, example IMA ENCODE model objects 782, example DECODE model objects 783, and example MAPOUT model objects 784. In some examples, the fourth instructions 774 are executed in response to user input. For example, in response to user input, the fourth instructions 774 can generate one or more of the IMA model objects 780. In FIG. 7C, the IMA model objects 780 correspond to the presentation layer 600 of FIG. 6. For example, the IMA MAPIN model objects 781 can correspond to the MAPIN abstraction 612 of FIG. 6. In FIG. 7, each of the IMA model objects 780 includes corresponding parameter information. For example, the IMA MAPIN model objects 781 can include one or more parameter identifiers with corresponding parameter definitions (e.g., the parameter definitions 311$a$, 311$b$ of FIG. 3).

In the illustrated example of FIG. 7C, the model manager 100 generates the IMA system model 754 by importing one or more of the plurality of IMA LRU models 702 including the first IMA LRU model 704. In FIG. 7C, the model manager 100 generates each one of the plurality of IMA LRU models 702 by importing model objects from the libraries 550 via a first library link 786. For example, the model manager 100 can instruct the first modeling environment 530 to import the first IMA LRU model 704 with corresponding IMA model objects associated with the lower layers 618, the presentation layers 600, and the upper layer 608 from the libraries 550 via the first library link 786. In FIG. 7C, the model manager 100 imports the plurality of IMA LRU models 702 where the lower layers 618, the presentation layers 600, and the upper layer 608 includes the corresponding first IMA protocol definitions 540. In FIG. 7C, the libraries 550 are generated based on importing information from the IMA model objects 780 via a second library link 788.

In the illustrated example of FIG. 7C, the model manager 100 validates the IMA system model 754 based on comparing one or more properties included in the IMA system model 754 to one or more properties included in the IMA bus elements 758, the ICD bus elements 762, etc. For example, the IMA system model 754 can correspond to a simulation of the aircraft system 106 and/or, more generally, the aircraft 108 of FIG. 1. The lower layers 618, the presentation layers 600, and the upper layer 608 of the first IMA LRU model 704 are coupled together with the IMA bus structure 756. In FIG. 7C, the model manager 100 verifies whether the IMA bus structure 756 coupling the lower layers 618, the presentation layers 600, and the upper layer 608 of the first IMA LRU model 704 include the properties specified by the ICD bus structure 760. For example, the model manager 100 can compare a property of one of the parameters included in the lower layer 618 to a property included in the ICD bus elements 762. In response to determining that the IMA bus structure 756 does not have one or more of the properties specified by the ICD bus elements 766 based on the comparison, the first modeling environment 530 halts an operation of the IMA system model 754 and generates an error message, an alert, etc.

Flowcharts representative of example hardware logic or machine readable instructions for implementing the model manager 100 of FIG. 4 is shown in FIGS. 8-11. The machine readable instructions can be a program or portion of a program for execution by a processor such as the processor 1212 shown in an example processor platform 1200 discussed below in connection with FIG. 12. The program can be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIG. 8-11, many other methods of implementing the model manager 100 can alternatively be used. For example, the order of execution of the blocks can be changed, and/or some of the blocks described can be changed, eliminated, or combined. Additionally or alternatively, any or all of the blocks can be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the processes of FIGS. 8-11 can be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 8:
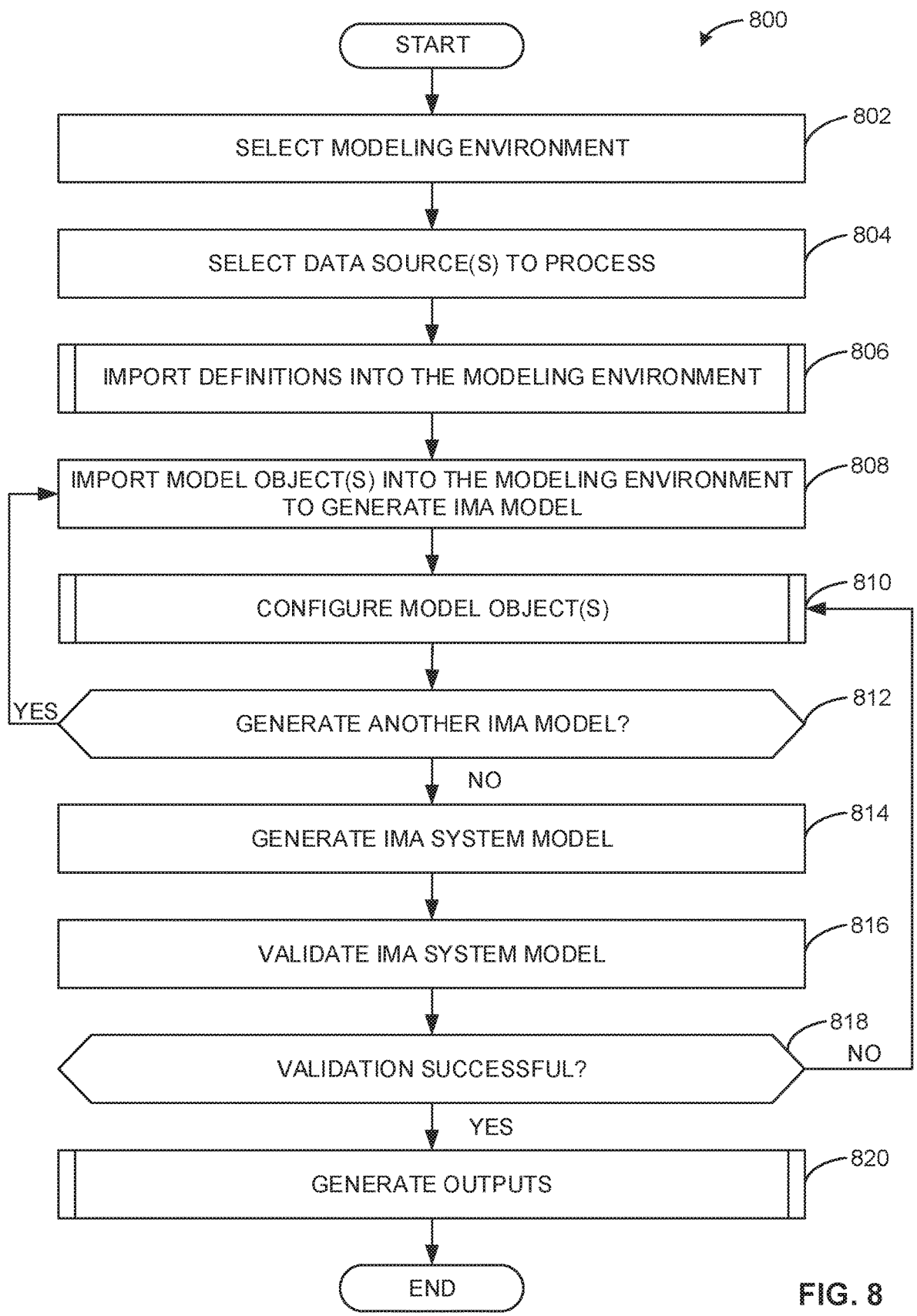
FIG. 8 is a flowchart representative of machine readable instructions which can be executed to implement the model manager apparatus of FIG. 4 to generate an IMA system model associated with the aircraft of FIG. 1.

FIG. 8 is a flowchart representative of an example method 800 that can be performed by the model manager 100 of FIGS. 1 and 3-7C to generate an IMA system model of the aircraft 108 of FIG. 1. The method 800 begins at block 802, at which the model manager 100 selects a modeling environment. For example, the modeling environment selector 410 can determine to use the first modeling environment 530 of FIG. 5 in which to generate the IMA system model 754 of FIG. 7C.

At block 804, the model manager 100 selects data source(s) to process. For example, the data source selector 420 can determine to use the first ICD source 508 of FIG. 5 to process. At block 806, the model manager 100 imports definitions into the modeling environment. For example, the interface importer 430 can import information into the language specific domain 504 from the data source domain 502 via the language neutral domain 506. An example process that can be used to implement block 806 is described below in connection with FIG. 9.

At block 808, the model manager 100 imports model object(s) into the modeling environment. For example, the model object handler 450 can import functions associated with the lower layer 618, the presentation layer 600, the upper layer 608, etc., of FIGS. 7A-7B into the first modeling environment 530 to generate the first IMA LRU model 704. For example, the model object handler 450 can import the digital COM read function 708, the sensor read function 711, etc., into the lower layer 618 of FIG. 7A. In another example, the model object handler 450 can import the DECODE function 712, the MAPOUT function 714, etc., into the presentation layer 600 of FIG. 7A.

At block 810, the model manager 100 configures the model object(s). For example, the model object handler 450 can configure one or more definitions included in the first IMA protocol definitions 540, the second IMA protocol definitions 544, etc. An example process that can be used to implement block 810 is described below in connection with FIG. 10.

At block 812, the model manager 100 determines whether to generate another IMA model. For example, the model object handler 450 can determine to generate a second IMA LRU model included in the plurality of IMA LRU models 702, a third IMA LRU model included in the plurality of IMA LRU models 702, etc.

If, at block 812, the model manager 100 determines to generate another IMA model, control returns to block 808 to import model object(s) into the modeling environment to generate another IMA model. If, at block 812, the model manager 100 determines not to generate another IMA model, then, at block 814, the model manager 100 generates an IMA system model. For example, the model object handler 450 can generate the IMA system model 754 of FIG. 7C by generating the plurality of IMA LRU models 702.

At block 816, the model manager 100 validates the IMA system model. For example, the interface validator 480 can execute the IMA system model 754, compare an output of the IMA system model 754 to a validation output (e.g., a validation threshold, a validation rule, etc.), and validate the IMA system model 754 based on the output matching and/or otherwise satisfying the validation output. In another example, the interface validator 480 can validate the IMA system model 754 by comparing one or more properties included in the IMA system model 754 to one or more properties included in the IMA bus elements 758, the ICD bus elements 762, etc., and validating the IMA system model 754 based on the comparison. For example, the one or more properties included in the IMA system model 754 can correspond to a property of ones of the first IMA protocol definitions 540.

At block 818, the model manager 100 determines whether the validation is successful. For example, the interface validator 480 can determine that the IMA system model 754 does not conform to one or more IMA definition rules based on the comparison of one or more properties included in the IMA system model 754 to one or more properties included in the IMA bus elements 758, the ICD bus elements 762, etc.

If, at block 818, the model manager 100 determines that the validation was not successful, control returns to block 810 to re-configure the model objects. If, at block 818, the model manager 100 determines that the validation is successful, then, at block 820, the model manager 100 generates outputs. For example, the interface exporter 440 can generate and deploy machine readable instructions associated with the IMA system model 754 to the aircraft system 106 and/or, more generally, the aircraft 108 of FIG. 1 to execute. For example, the aircraft 108 can operate by executing the machine readable instructions based on the IMA system model 754. In another example, the interface exporter 440 can generate and deploy supply chain and/or manufacturing build instructions to initiate production of the aircraft system 106 and/or, more generally, the aircraft 108 of FIG. 1 based on the IMA system model 754. An example process that can be used to implement block 820 is described below in connection with FIG. 11. In response to generating the outputs, the method 800 of FIG. 8 concludes.

Figure 9:
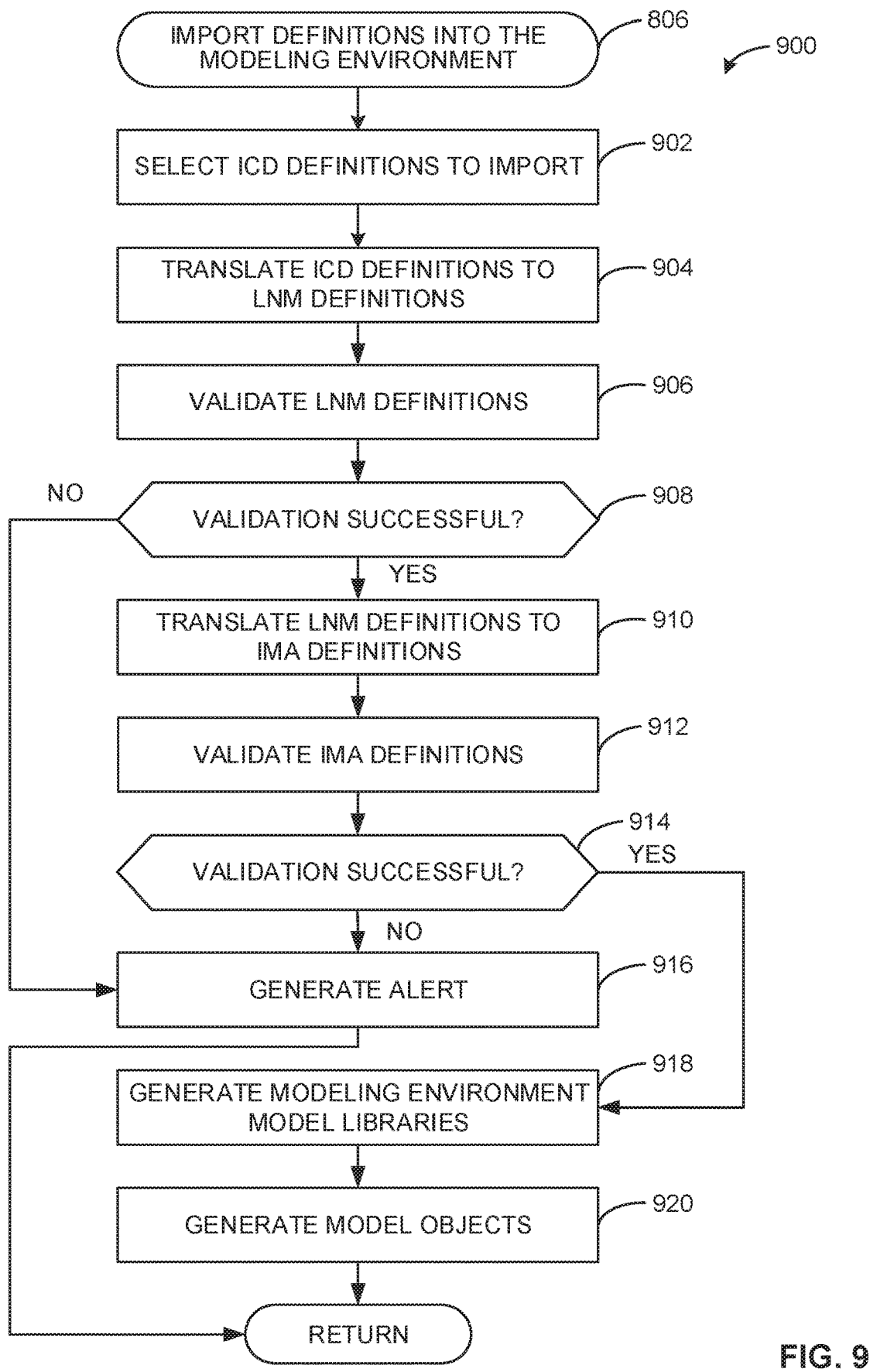
FIG. 9 is a flowchart representative of machine readable instructions which can be executed to implement the model manager apparatus of FIG. 4 to import definitions associated with an IMA system model into a modeling environment.

FIG. 9 is a flowchart representative of an example method 900 that can be performed by the model manager 100 of FIGS. 1 and 3-7C to import definitions into the modeling environment. The process of FIG. 9 can be used to implement the operation of block 806 of FIG. 8. The method 900 begins at block 902, at which the model manager 100 selects ICD definitions to import. For example, the data source selector 420 can select the first ICD protocol definitions 514 of the first ICD source 508 to import.

At block 904, the model manager 100 translates ICD definitions to LNM definitions. For example, the ICD translator 460 can implement the first ICD translator 520 to translate the first ICD protocol definitions 514 to the first LNM protocol definitions 526 included in the LNM 518 of FIG. 5.

At block 906, the model manager 100 validates the LNM definitions. For example, the interface validator 480 can compare the first LNM protocol definitions 526 to one or more LNM definition rules and validate the first LNM protocol definitions 526 based on the comparison.

At block 908, the model manager 100 determines whether the validation is successful. For example, the interface validator 480 can determine that the first LNM protocol definitions 526 are validated based on the first LNM protocol definitions 526 complying with and/or otherwise satisfying one or more LNM definition rules.

If, at block 908, the model manager 100 determines that the validation is not successful, control proceeds to block 916 to generate an alert. If, at block 908, the model manager 100 determines that the validation is successful, then, at block 910, the model manager 100 translates LNM definitions to IMA definitions. For example, the LSM translator 470 can implement the first LSM translator 534 to translate the first LNM protocol definitions 526 to the first IMA protocol definitions 540.

At block 912, the model manager 100 validates the IMA definitions. For example, the interface validator 480 can compare the first IMA protocol definitions 540 to one or more IMA definition rules and validate the first IMA protocol definitions 540 based on the comparison.

At block 914, the model manager 100 determines whether the validation is successful. For example, the interface validator 480 can determine that the first IMA protocol definitions 540 are validated based on the first IMA protocol definitions 540 complying with and/or otherwise satisfying one or more IMA definition rules.

If, at block 914, the model manager 100 determines that the validation is not successful, control proceeds to block 916 to generate an alert. For example, the interface validator 480 can generate an alert and display the alert on a user interface to notify a user that the validation is not successful. In response to generating the alert, the method 900 of FIG. 9 returns to block 808 of the example of FIG. 8 to import model object(s) into the modeling environment to generate an IMA model.

If, at block 914, the model manager 100 determines that the validation is successful, control proceeds to block 918 to generate modeling environment model libraries. For example, the interface importer 430 can generate the libraries 550 of FIG. 5 in response to generating the first IMA protocol definitions 540.

At block 920, the model manager 100 generates model objects. For example, the interface importer 430 can generate the IMA model objects 780 of FIG. 7C in response to generating the libraries 550. In response to generating the model objects, the method 900 of FIG. 9 returns to block 808 of the example of FIG. 8 to import model object(s) into the modeling environment to generate an IMA model.

Figure 10:
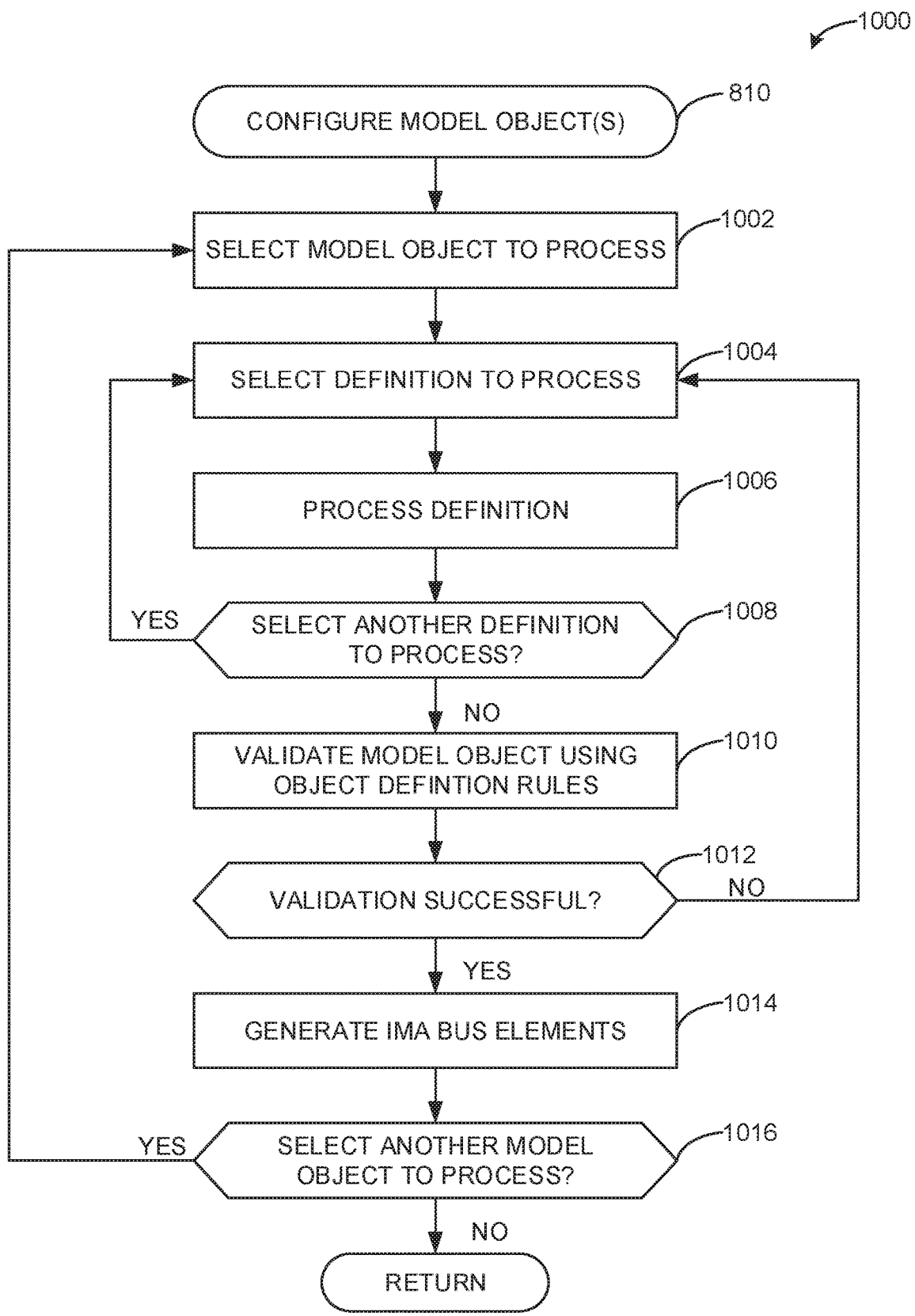
FIG. 10 is a flowchart representative of machine readable instructions which can be executed to implement the model manager apparatus of FIG. 4 to configure model object(s) associated with an IMA system model.

FIG. 10 is a flowchart representative of an example method 1000 that can be performed by the model manager 100 of FIGS. 1 and 3-7C to configure model object(s). The process of FIG. 10 can be used to implement the operation of block 810 of FIG. 8. The method 1000 begins at block 1002, at which the model manager 100 selects a model object to process. For example, the model object handler 450 can select the DECODE function 712 of FIG. 7A to process.

At block 1004, the model manager 100 selects a definition to process. For example, the model object handler 450 can select a first one of the first IMA protocol definitions 540 to process such as the "TX_COMP_ORT 10121" IMA interface definition included in the IMA interface definitions 320 of FIG. 3.

At block 1006, the model manager 100 processes the definition. For example, the model object handler 450 can add, delete, or modify one of the first IMA protocol definitions 540. For example, the model object handler 450 can modify information associated with the "TX_COM_PORT 10121" IMA interface definition included in the IMA interface definitions 320 of FIG. 3.

At block 1008, the model manager 100 determines whether to select another definition to process. For example, the model object handler 450 can determine to select a second one of the first IMA protocol definitions 540 to process.

If, at block 1008, the model manager 100 determines to select another definition to process, control returns to block 1004 to select another definition to process. If, at block 1008, the model manager 100 determines not to select another definition to process, then, at block 1010, the model manager 100 validates the model object using IMA definition rules. For example, the interface validator 480 can compare one or more of the first IMA protocol definitions 540 to one or more IMA definition rules.

At block 1012, the model manager 100 determines whether the validation is successful. For example, the interface validator 480 can determine that one or more of the first IMA protocol definitions 540 complies with and/or otherwise satisfies the one or more IMA definition rules.

If, at block 1012, the model manager 100 determines that the validation is not successful, control returns to block 1004 to select a definition to process. For example, the model object handler 450 can select the definition that failed validation. If, at block 1012, the model manager 100 determines that validation is successful, then, at block 1014, the model manager 100 generates IMA bus elements. For example, the model manager 100 can generate the first IMA bus element 764 and associate the first IMA bus element 764 with the DECODE function 712.

At block 1016, the model manager 100 selects another model object to process. For example, the model object handler 450 can determine to select the MAPOUT function 714 of FIG. 7A to process. If at block 1016, the model manager 100 determines to select another model object to process, control returns to block 1002 to select another model object to process. If at block 1016, the model manager 100 determines not to select another model object to process, the method 1000 of FIG. 10 returns to block 812 of the example of FIG. 8 to determine whether to generate another IMA model.

Figure 11:
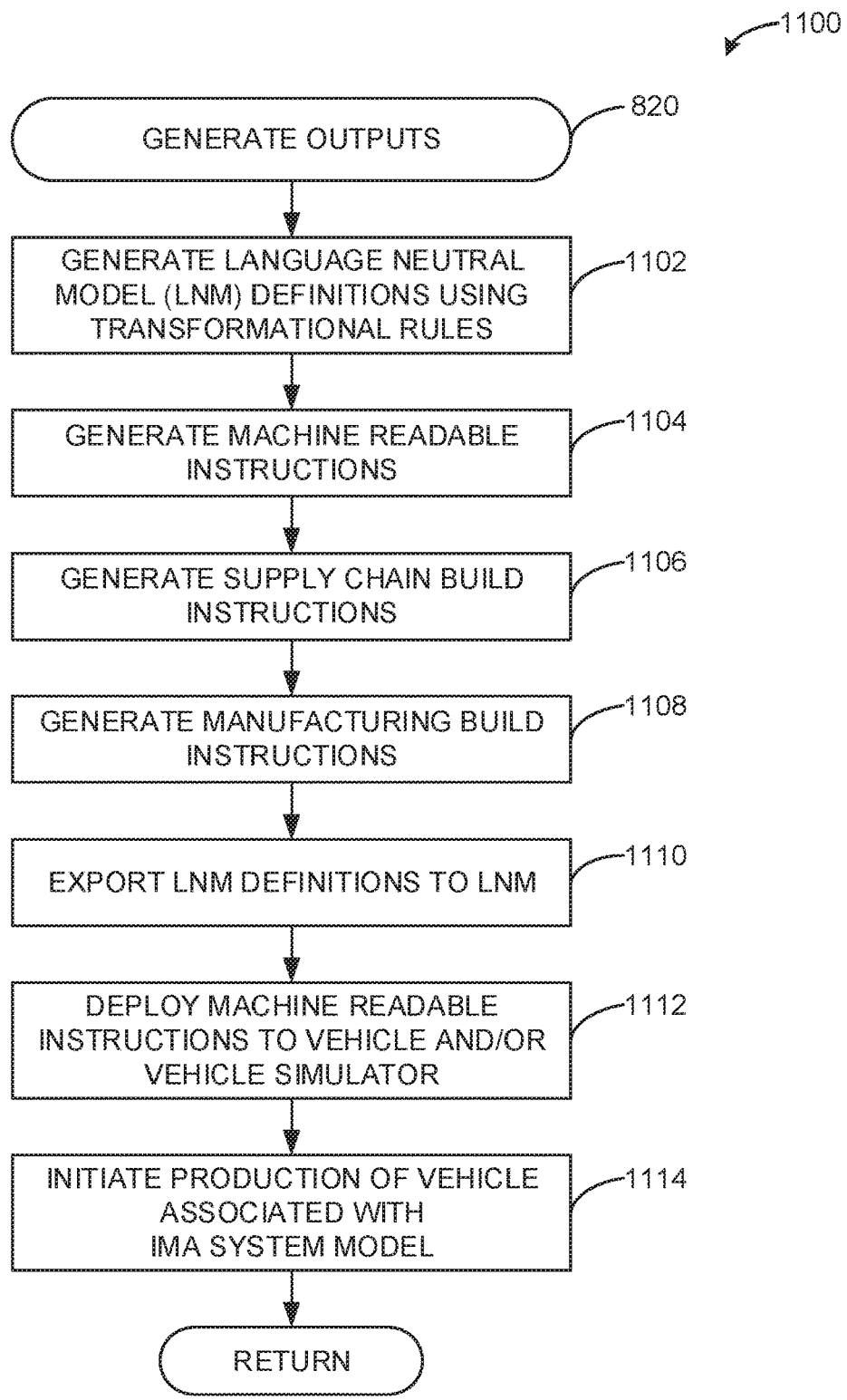
FIG. 11 is a flowchart representative of machine readable instructions which can be executed to implement the model manager apparatus of FIG. 4 to generate outputs associated with an IMA system model.

FIG. 11 is a flowchart representative of an example method 1100 that can be performed by the model manager 100 of FIGS. 1 and 3-7C to generate outputs. The process of FIG. 11 can be used to implement the operation of block 820 of FIG. 8. The method 1100 begins at block 1102, at which the model manager 100 generates language neutral model (LNM) definitions using transformational rules. For example, the interface exporter 440 can generate the first LNM protocol definitions 526 of FIG. 5 to be exported to the LNM 518 of FIG. 5 based on the first IMA protocol definitions 540 included in the IMA system model 754 of FIG. 7C.

At block 1104, the model manager 100 generates machine readable instructions. For example, the interface exporter 440 can generate computer executable code corresponding to an execution of the plurality of IMA LRU models 702 included in the IMA system model 754 of FIG. 7C.

At block 1106, the model manager 100 generates supply chain build instructions. For example, the interface exporter 440 can generate the outputs 124 of FIG. 1 to include instructions to be executed by a supply chain computing system to initiate an ordering of components, an assignment of labor, etc., to build an aircraft system (e.g., the aircraft system 106 of FIG. 1) associated with the IMA system model 754 of FIG. 7C.

At block 1108, the model manager 100 generates manufacturing build instructions. For example, the interface exporter 440 can generate the outputs 124 of FIG. 1 to include instructions to be executed by a manufacturing computing system to initiate a manufacturing of components, an assignment of labor, etc., to build an aircraft system (e.g., the aircraft system 106 of FIG. 1) associated with the IMA system model 754 of FIG. 7C.

At block 1110, the model manager 100 exports LNM definitions to the LNM. For example, the interface exporter 440 can export the first LNM protocol definitions 526 to the LNM 518, which can be used by other IMA models, other IMA system models, etc. In such an example, the interface exporter 440 can direct the first LNM protocol definitions 526 to be translated to the first ICD protocol definitions 514 via the first ICD translator 520.

At block 1112, the model manager 100 deploys machine readable instructions to a vehicle and/or a vehicle simulator. For example, the interface exporter 440 can deploy the machine readable instructions to the aircraft system 106 and/or the aircraft 108 of FIG. 1 to be executed by the aircraft system 106 and/or the aircraft 108.

At block 1114, the model manager 100 initiates production of a vehicle associated with the IMA system model. For example, the interface exporter 440 can initiate a production of the aircraft system 106, the aircraft 108, etc., associated with the IMA system model 754. In response to initiating the production of the vehicle associated with the IMA system model, the method 1100 returns to the example of FIG. 8 to conclude.

Figure 12:
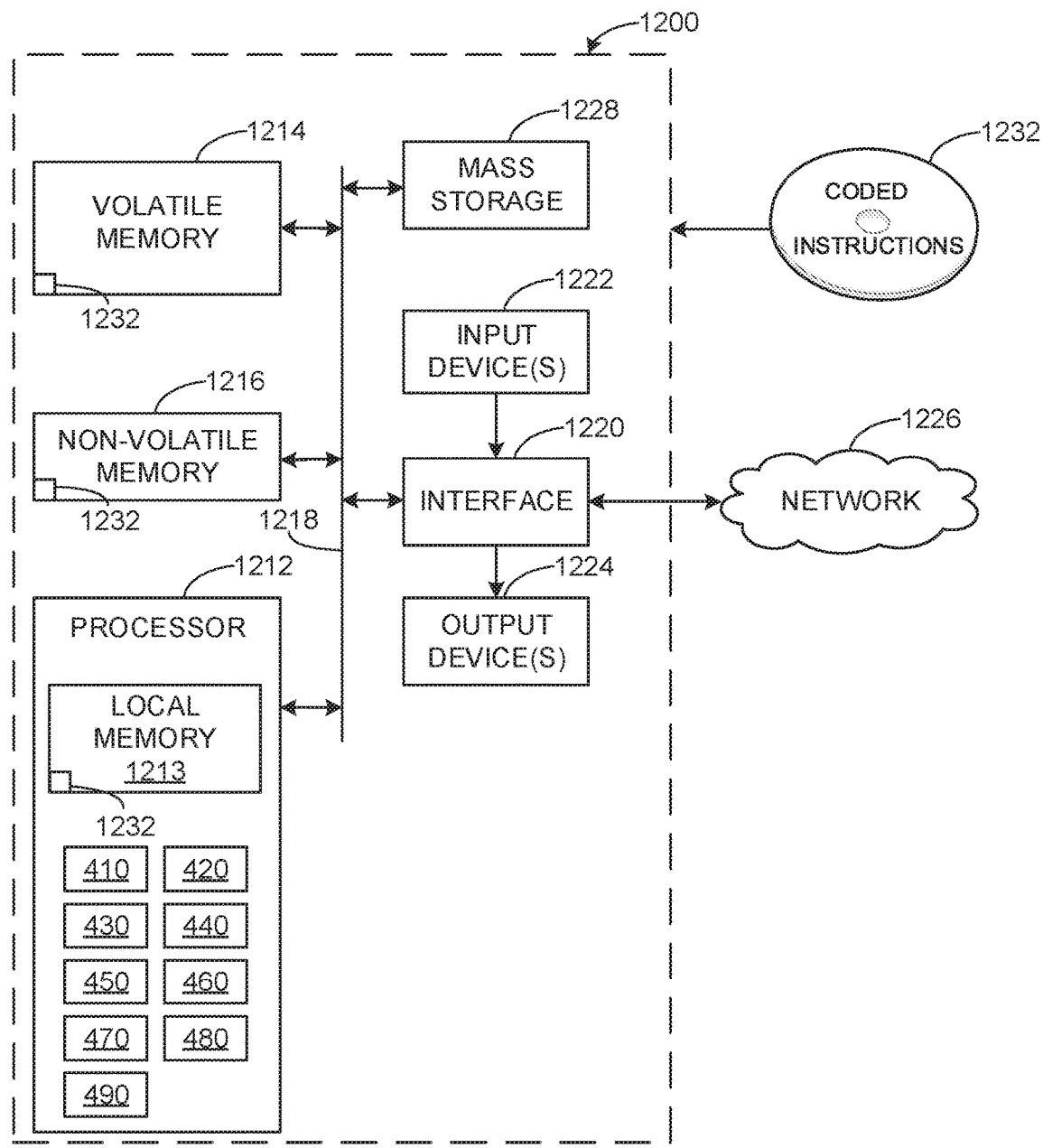
FIG. 12 is a block diagram of an example processing platform structured to execute the instructions of FIGS. 8-11 to implement the model manager apparatus of FIG. 4.

FIG. 12 is a block diagram of the processor platform 1200 structured to execute the instructions of FIGS. 8-11 to implement the model manager 100 of FIGS. 1 and 3-7C. The processor platform 1200 can be, for example, a server, a personal computer, a workstation, a self-learning machine (e.g., a neural network), or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor can be a semiconductor based (e.g., silicon based) device. In this example, the processor 1212 implements the modeling environment selector 410, the data source selector 420, the interface importer 430, the interface exporter 440, the model object handler 450, the ICD translator 460, the LSM translator 470, the interface validator 480, and the report generator 490 of FIG. 4.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 can be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1216 can be implemented by flash memory and/or any other desired type of memory device. Access to the main memory 1214, 1216 is controlled by a memory controller.

The processor platform 1200 of the illustrated example also includes an interface circuit 1220. The interface circuit 1220 can be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1220 of the illustrated example, thus, typically includes a graphics driver card, a graphics driver chip, and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 8-11 can be stored in the mass storage device 1228, in the volatile memory 1214, in the non-volatile memory 1216, and/or on a removable non-transitory computer readable storage medium such as a CD or DVD.

From the foregoing, it will be appreciated that example systems, methods, apparatus, and articles of manufacture have been disclosed that generate an integrated modular architecture model. The model manager apparatus described herein generates abstractions of aircraft components and systems to be used to generate an IMA model in a computer modeling environment. The model manager apparatus described herein stores definitions in an interface control data source to facilitate re-using of abstractions between IMA models. The model manager apparatus described herein translates information included in the interface control data source to a computer modeling environment via a language neutral model.

Examples described herein reduce the time to generate an IMA model compared to prior examples due to the ability of the model manager apparatus to import previously defined or generated IMA models into new IMA models. Examples described herein reduce storage capabilities required to generate an IMA model corresponding to a vehicle such as an aircraft due to a reduction in a number of unique IMA models needed to generate the vehicle IMA model. Examples described herein improve database efficiency by using a language neutral model database to facilitate a translation of data between dissimilar data formatted information storage systems compared to previous examples requiring different databases to facilitate mapping of information between dissimilar data sources.

Example 1 includes an apparatus, comprising an interface importer to import first integrated modular architecture (IMA) protocol definitions into a first computer modeling environment to generate a plurality of libraries based on the first IMA protocol definitions, and generate a plurality of IMA model objects based on the plurality of libraries, a model object handler to import ones of the plurality of IMA model objects into the first computer modeling environment to generate a first IMA model corresponding to an aircraft system of an aircraft, and generate an IMA system model corresponding to the aircraft by generating a plurality of IMA models including the first IMA model, an interface validator to validate the IMA system model by comparing an output of the IMA system model to a validation output, an interface exporter to generate manufacturing build instructions of the aircraft system when the IMA system model is validated, and a report generator to initiate production of the aircraft system based on the manufacturing build instructions.

Example 2 includes the apparatus of example 1, wherein the first IMA protocol definitions includes at least one of interface information, requirement information, or specification information associated with the aircraft system.

Example 3 includes the apparatus of example 1, wherein the interface importer imports the first IMA protocol definitions by instructing an interface control database (ICD) translator to use a first ICD translator to convert first ICD protocol definitions included in a first ICD source to first language neutral model (LNM) protocol definitions included in a LNM, and instructing a language specific model (LSM) translator to use a first LSM translator to convert the first LNM protocol definitions to the first IMA protocol definitions included in the first modeling environment.

Example 4 includes the apparatus of example 1, wherein the first IMA model includes a lower layer, a presentation layer, and an upper layer, the lower layer including at least one of a digital communication read function or a sensor read function.

Example 5 includes the apparatus of example 4, wherein the interface validator validates the IMA system model by at least one of obtaining network data in real-time from a network switch via the digital communication read function or obtaining sensor data in real-time from a sensor via the sensor read function.

Example 6 includes the apparatus of example 1, wherein the interface exporter generates machine readable instructions based on the IMA system model, deploys the machine readable instructions to at least one of the aircraft system or the aircraft, and causes an operation of at least one of the aircraft system or the aircraft based on the machine readable instructions.

Example 7 includes a method, comprising importing first integrated modular architecture (IMA) protocol definitions into a first computer modeling environment to generate a plurality of libraries based on the first IMA protocol definitions, generating a plurality of IMA model objects based on the plurality of libraries, importing ones of the plurality of IMA model objects into the first computer modeling environment to generate a first IMA model corresponding to an aircraft system of an aircraft, generating an IMA system model corresponding to the aircraft by generating a plurality of IMA models including the first IMA model, validating the IMA system model by comparing an output of the IMA system model to a validation output, in response to validating the IMA system model based on the comparison, generating manufacturing build instructions of the aircraft system, and initiating production of the aircraft system based on the manufacturing build instructions.

Example 8 includes the method of example 7, wherein the first IMA protocol definitions includes at least one of interface information, requirement information, or specification information associated with the aircraft system.

Example 9 includes the method of example 7, wherein importing the first IMA protocol definitions includes converting first interface control database (ICD) protocol definitions included in a first ICD source to first language neutral model (LNM) protocol definitions included in a LNM with a first ICD translator, and converting the first LNM protocol definitions to the first IMA protocol definitions included in the first modeling environment with a first language specific model (LSM) translator.

Example 10 includes the method of example 9, further including comparing ones of the first LNM protocol definitions to at least one LNM definition rule and validating the first LNM protocol definitions based on the comparison, and comparing ones of the first IMA protocol definitions to the at least one IMA definition rule and validating the first IMA protocol definitions based on the comparison.

Example 11 includes the method of example 7, wherein the first IMA model includes a lower layer, a presentation layer, and an upper layer, the lower layer including at least one of a digital communication read function or a sensor read function.

Example 12 includes the method of example 11, wherein validating the IMA system model includes at least one of obtaining network data in real-time from a network switch via the digital communication read function or obtaining sensor data in real-time from a sensor via the sensor read function.

Example 13 includes the method of example 7, further including generating machine readable instructions based on the IMA system model, deploying the machine readable instructions to at least one of the aircraft system or the aircraft, and causing an operation of at least one of the aircraft system or the aircraft based on the machine readable instructions.

Example 14 includes a non-transitory computer readable storage medium comprising instructions which, when executed, cause a machine to at least import first integrated modular architecture (IMA) protocol definitions into a first computer modeling environment to generate a plurality of libraries based on the first IMA protocol definitions, generate a plurality of IMA model objects based on the plurality of libraries, import ones of the plurality of IMA model objects into the first computer modeling environment to generate a first IMA model corresponding to an aircraft system of an aircraft, generate an IMA system model corresponding to the aircraft by generating a plurality of IMA models including the first IMA model, validate the IMA system model by comparing an output of the IMA system model to a validation output, generate manufacturing build instructions of the aircraft system when the IMA system model is validated based on the comparison, and initiate production of the aircraft system based on the manufacturing build instructions.

Example 15 includes the non-transitory computer readable storage medium of example 14, wherein the first IMA protocol definitions includes at least one of interface information, requirement information, or specification information associated with the aircraft system.

Example 16 includes the non-transitory computer readable storage medium of example 14, further including instructions which, when executed, cause the machine to at least convert first interface control database (ICD) protocol definitions included in a first ICD source to first language neutral model (LNM) protocol definitions included in a LNM with a first ICD translator, and convert the first LNM protocol definitions to the first IMA protocol definitions included in the first modeling environment with a first language specific model (LSM) translator.

Example 17 includes the non-transitory computer readable storage medium of example 16, further including instructions which, when executed, cause the machine to at least compare one of the first LNM protocol definitions to an LNM definition rule and validating the first LNM protocol definitions based on the comparison, and compare one of the first IMA protocol definitions to an IMA definition rule and validating the first IMA protocol definitions based on the comparison.

Example 18 includes the non-transitory computer readable storage medium of example 14, wherein the first IMA model includes a lower layer, a presentation layer, and an upper layer, the lower layer including at least one of a digital communication read function or a sensor read function.

Example 19 includes the non-transitory computer readable storage medium of example 18, further including instructions which, when executed, cause the machine to at least obtain network data in real-time from a network switch via the digital communication read function or obtain sensor data in real-time from a sensor via the sensor read function.

Example 20 includes the non-transitory computer readable storage medium of example 14, further including instructions which, when executed, cause the machine to at least generate machine readable instructions based on the IMA system model, deploy the machine readable instructions to at least one of the aircraft system or the aircraft, and cause an operation of at least one of the aircraft system or the aircraft based on the machine readable instructions.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus, comprising:
memory including instructions;
and at least one processor to execute the instructions to at least:
import interface control database (ICD) protocol definitions associated with a communication protocol of a first aircraft system of an aircraft from an ICD source into a language neutral model (LNM), the ICD protocol definitions corresponding to at least one of control logic functions or configuration parameters utilized by the communication protocol, the LNM corresponding to a model that utilizes a data format or a data structure different from the ICD source and a computer modeling environment, the LNM including LNM protocol definitions corresponding to the at least one of the control logic functions or the configuration parameters, the ICD protocol definitions based on a first data format different from a second data format of the LNM protocol definitions;

convert at least one of the LNM protocol definitions into integrated modular architecture (IMA) protocol definitions having a third data format of the computer modeling environment, the IMA protocol definitions corresponding to the at least one of the control logic functions or the configuration parameters, the third data format different from the first data format and the second data format;

import the IMA protocol definitions into the computer modeling environment to generate a plurality of model libraries based on the IMA protocol definitions;

generate a plurality of IMA model objects based on the plurality of the model libraries, the plurality of the IMA model objects including a first IMA model object, the first IMA model object to simulate operation of the first aircraft system based on the first aircraft system utilizing the communication protocol;

import at least one of the plurality of the IMA model objects into the computer modeling environment to generate a plurality of IMA models including a first IMA model, the first IMA model including the first IMA model object, the first IMA model to simulate operation of one or more aircraft systems of the aircraft based on the one or more aircraft systems utilizing the communication protocol, the one or more aircraft systems including the first aircraft system;

generate an IMA system model based on the plurality of the IMA models, the IMA system model to simulate operation of the aircraft utilizing the communication protocol;

validate the IMA system model by comparing a first output of the IMA system model to a validation output, the validation output corresponding to an expected output of one of the one or more aircraft systems;

generate manufacturing build instructions of the first aircraft system in response to validating the IMA system model based on the comparison of the first output to the validation output;

and transmit the manufacturing build instructions to a computing system to initiate production of the first aircraft system based on the manufacturing build instructions.

2. The apparatus of claim 1, wherein the IMA protocol definitions include at least one of interface information, requirement information, or specification information associated with at least one of the communication protocol or the first aircraft system.

3. The apparatus of claim 1, wherein the at least one processor is to execute the instructions to:

instruct an ICD to convert the ICD protocol definitions included in the ICD source to the LNM protocol definitions included in the LNM; and instruct a language specific model (LSM) translator to convert the ones of the LNM protocol definitions to the IMA protocol definitions, the second data format of the LNM based on a first modeling language, the third data format based on a second modeling language different from the first modeling language.

4. The apparatus of claim 1, wherein the first IMA model includes one or more IMA model objects for implementing a lower layer, a presentation layer, and an upper layer, the lower layer including a second IMA model object implementing at least one of a digital communication read function or a sensor read function.

5. The apparatus of claim 4, wherein the first aircraft system includes a physical network switch and a physical sensor, the at least one processor is in communication with the physical network switch and the physical sensor, and the at least one processor is to execute the instructions to validate the IMA system model based on at least one of obtaining network data from the physical network switch via the digital communication read function or obtaining sensor data from the physical sensor via the sensor read function.

6. The apparatus of claim 1, wherein the at least one processor is to execute the instructions to:

generate machine readable instructions based on the IMA system model;

deploy the machine readable instructions to at least one of the first aircraft system or the aircraft; and cause an operation of at least one of the first aircraft system or the aircraft based on the machine readable instructions.

7. A method, comprising:

importing interface control database (ICD) protocol definitions associated with a communication protocol of a first aircraft system of an aircraft from an ICD source into a language neutral model (LNM), the ICD protocol definitions corresponding to at least one of control logic functions or configuration parameters utilized by the communication protocol, the LNM corresponding to a model that utilizes a data format or a data structure different from the ICD source and a computer modeling environment, the LNM including LNM protocol definitions corresponding to the at least one of the control logic functions or the configuration parameters, the ICD protocol definitions based on a first data format different from a second data format of the LNM protocol definitions;

converting at least one of the LNM protocol definitions into integrated modular architecture (IMA) protocol definitions having a third data format of the computer modeling environment, the IMA protocol definitions corresponding the at least one of the control logic functions or the configuration parameters, the third data format different from the first data format and the second data format;

importing the IMA protocol definitions into a the computer modeling environment to generate a plurality of model libraries based on the IMA protocol definitions;

generating a plurality of IMA model objects based on the plurality of the model libraries, the plurality of the IMA model objects including a first IMA model object, the first IMA model object to simulate operation of the first aircraft system based on the first aircraft system utilizing the communication protocol;

importing at least one of the plurality of the IMA model objects into the computer modeling environment to generate a plurality of IMA models including a first IMA model, the first IMA model including the first IMA model object, the first IMA model to simulate operation of one or more aircraft systems of the aircraft based on the one or more aircraft systems utilizing the communication protocol, the one or more aircraft systems including the first aircraft system;

generating an IMA system model based on the plurality of the IMA models, the IMA system model to simulate operation of the aircraft utilizing the communication protocol;

validating the IMA system model by comparing a first output of the IMA system model to a validation output, the validation output corresponding to an expected output of one of the one or more aircraft systems;

in response to validating the IMA system model based on the comparison of the first output to the validation output, generating manufacturing build instructions of the first aircraft system;

and transmitting the manufacturing build instructions to a computing system to initiate production of the first aircraft system based on the manufacturing build instructions.

8. The method of claim 7, wherein the IMA protocol definitions include at least one of interface information, requirement information, or specification information associated with at least one of the communication protocol or the first aircraft system.

9. The method of claim 7, wherein importing the IMA protocol definitions includes:

converting the ICD protocol definitions included in the ICD source to the LNM protocol definitions included in the LNM with a first an ICD translator; and converting the ones of the LNM protocol definitions to the IMA protocol definitions with a language specific model (LSM) translator, the second data format of the LNM based on a first modeling language, the third data format based on a second modeling language different from the first modeling language.

10. The method of claim 9, further including:

comparing the ones of the LNM protocol definitions to at least one LNM definition rule and validating the ones of the LNM protocol definitions based on the comparison; and comparing ones of the IMA protocol definitions to at least one IMA definition rule and validating the ones of the IMA protocol definitions based on the comparison.

11. The method of claim 7, wherein the first IMA model includes one or more IMA model objects for implementing a lower layer, a presentation layer, and an upper layer, the lower layer including a second IMA model object implementing at least one of a digital communication read function or a sensor read function.

12. The method of claim 11, wherein the first aircraft system includes a physical network switch and a physical sensor, and further including validating the IMA system model based on at least one of obtaining network data from the physical network switch via the digital communication read function or obtaining sensor data from the physical sensor via the sensor read function.

13. The method of claim 7, further including:

generating machine readable instructions based on the IMA system model;

deploying the machine readable instructions to at least one of the first aircraft system or the aircraft; and causing an operation of at least one of the first aircraft system or the aircraft based on the machine readable instructions.

14. A non-transitory computer readable storage medium comprising instructions which, when the instructions are executed by at least one processor, cause the at least one processor to at least:

import interface control database (ICD) protocol definitions associated with a communication protocol of a first aircraft system of an aircraft from an ICD source into a language neutral model (LNM), the ICD protocol definitions corresponding to at least one of control logic functions or configuration parameters utilized by the communication protocol, the LNM corresponding to a model that utilizes a data format or a data structure different from the ICD source and a computer modeling environment, the LNM including LNM protocol definitions corresponding to the at least one of the control logic functions or the configuration parameters, the ICD protocol definitions based on a first data format different from a second data format of the LNM protocol definitions;

convert at least one of the LNM protocol definitions into integrated modular architecture (IMA) protocol definitions having a third data format of the computer modeling environment, the IMA protocol definitions corresponding to ones of the at least one of the control logic functions or the configuration parameters, the third data format different from the first data format and the second data format;

import the IMA protocol definitions into a the computer modeling environment to generate a plurality of model libraries based on the IMA protocol definitions;

generate a plurality of IMA model objects based on the plurality of the model libraries, the plurality of the IMA model objects including a first IMA model object, the first IMA model object to simulate operation of the first aircraft system based on the first aircraft system utilizing the communication protocol;

import at least one of the plurality of the IMA model objects into the computer modeling environment to generate a plurality of IMA models including a first IMA model, the first IMA model including the first IMA model object the first IMA model to simulate operation of one or more aircraft systems of the aircraft based on the one or more aircraft systems utilizing the communication protocol, the one or more aircraft systems including the first aircraft system;

generate an IMA system model based on the plurality of the IMA models, the IMA system model to simulate operation of the aircraft utilizing the communication protocol;

validate the IMA system model by comparing a first output of the IMA system model to a validation output, the validation output corresponding to an expected output of one of the one or more aircraft systems;

generate manufacturing build instructions of the first aircraft system in response to validating the IMA system model based on the comparison of the first output to the validation output;

and transmit the manufacturing build instructions to a computing system to initiate production of the first aircraft system based on the manufacturing bud instructions.

15. The non-transitory computer readable storage medium of claim 14, wherein the IMA protocol definitions include at least one of interface information, requirement information, or specification information associated with at least one of the communication protocol or the first aircraft system.

16. The non-transitory computer readable storage medium of claim 14, wherein the instructions, when executed, cause the at least one processor to at least:

convert the ICD protocol definitions included in the ICD source to the LNM protocol definitions included in the LNM with a first an ICD translator; and convert the ones of the LNM protocol definitions to the IMA protocol definitions with a language specific model (LSM) translator, the second data format of the LNM based on a first modeling language, the third data format based on a second modeling language different from the first modeling language.

17. The non-transitory computer readable storage medium of claim 16, wherein the instructions, when executed by the at least one processor, cause the at least one processor to at least:
compare the ones of the LNM protocol definitions to an LNM definition rule and validating the ones of the LNM protocol definitions based on the comparison; and
compare ones of the IMA protocol definitions to an IMA definition rule and validating the ones of the IMA protocol definitions based on the comparison.

18. The non-transitory computer readable storage medium of claim 14, wherein the first IMA model includes one or more IMA model objects for implementing a lower layer, a presentation layer, and an upper layer, the lower layer including a second IMA model object implementing at least one of a digital communication read function or a sensor read function.

19. The non-transitory computer readable storage medium of claim 18, wherein the first aircraft system includes a physical network switch and a physical sensor, the at least one processor to be in communication with the physical network switch and the physical sensor, and the instructions, when executed by the at least one processor, cause the at least one processor to at least obtain network data from the physical network switch via the digital communication read function or obtain sensor data from the physical sensor via the sensor read function.

20. The non-transitory computer readable storage medium of claim 14, wherein the instructions are first instructions and the first instructions, when executed by the at least one processor, cause the at least one processor to at least:
generate second machine readable instructions based on the IMA system model;
deploy the second machine readable instructions to at least one of the first aircraft system or the aircraft; and
cause an operation of at least one of the first aircraft system or the aircraft based on the second machine readable instructions.

* * * * *

UNITED STATES PATENT AND TRADEMARK OFFICE
CERTIFICATE OF CORRECTION

PATENT NO. : 11,106,838 B2  
APPLICATION NO. : 15/948180  
DATED : August 31, 2021  
INVENTOR(S) : Jackson et al.

Page 1 of 1

It is certified that error appears in the above-identified patent and that said Letters Patent is hereby corrected as shown below:

In the Claims

Column 39, Line 55 (Claim 3): after "instruct an ICD" add --translator--
Column 40, Line 46 (Claim 7): replace "into a the" with --into the--
Column 41, Line 22 (Claim 9): replace "with a first an" with --with an--
Column 42, Lines 14-15 (Claim 14): replace "corresponding to ones of the at least" with --corresponding to the at least--
Column 42, Line 32 (Claim 14): replace "model object the first" with --model object, the first--
Column 42, Line 63 (Claim 16): replace "with a first an ICD" with --with an ICD--

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*